(12) United States Patent
    Neumann

(10) Patent No.: US 11,880,175 B2
(45) Date of Patent: Jan. 23, 2024

(54) METHOD FOR CONTROLLING AN AUTOMATION PROCESS IN REAL TIME

(71) Applicant: Beckhoff Automation GmbH, Verl (DE)

(72) Inventor: Klaus Neumann, Gütersloh (DE)

(73) Assignee: Beckhoff Automation GmbH, Verl (DE)

( * ) Notice: Subject to any disclaimer, the term of this patent is extended or adjusted under 35 U.S.C. 154(b) by 314 days.

(21) Appl. No.: 17/350,783

(22) Filed: Jun. 17, 2021

(65) Prior Publication Data

US 2021/0311439 A1  Oct. 7, 2021

Related U.S. Application Data

(63) Continuation of application No. PCT/EP2019/086426, filed on Dec. 19, 2019.

(30) Foreign Application Priority Data

Dec. 20, 2018  (DE) ..................... 10 2018 133 058.8

(51) Int. Cl.
    *G05B 13/02* (2006.01)
(52) U.S. Cl.
    CPC .................. *G05B 13/027* (2013.01)
(58) Field of Classification Search
    CPC ................................... G05B 13/027

(Continued)

(56) References Cited

U.S. PATENT DOCUMENTS

| 4,215,399 A | 7/1980 | Mahaffey et al. |
| 5,598,076 A | 1/1997 | Neubauer et al. |

(Continued)

FOREIGN PATENT DOCUMENTS

| CN | 1598720 A | 3/2005 |
| CN | 101978332 A | 2/2011 |

(Continued)

OTHER PUBLICATIONS

Cognex Corp., "Connecitivity and Networking are Key", TechNOTE, 2012, 2 pages.

(Continued)

*Primary Examiner* — Md Azad
(74) *Attorney, Agent, or Firm* — Dorsey & Whitney LLP

(57) ABSTRACT

A method for controlling an automation process in real time based on a change profile of at least one process variable, comprises determining a first change profile by a real-time-capable recognition method based on a non-linear optimization process taking into consideration at least one boundary condition of the process variable, determining a second change profile by a numerical algorithm based on the first change profile, including adapting a selected profile function to the first change profile by a numerical adaptation process and identifying the adapted profile function as a second change profile, checking whether the second change profile satisfies at least one secondary condition of the process variable, controlling the automation process based on the second change profile if the second change profile satisfies the secondary condition, and controlling the automation process based on a predetermined fallback profile if the second change profile does not satisfy the secondary condition.

16 Claims, 15 Drawing Sheets

(58) Field of Classification Search
USPC .......................................................... 700/275
See application file for complete search history.

(56) References Cited

U.S. PATENT DOCUMENTS

| | | | |
|---|---|---|---|
| 5,966,682 A * | 10/1999 | Gramckow | G05B 17/02 702/170 |
| 6,029,095 A | 2/2000 | Boissy et al. | |
| 6,167,425 A | 12/2000 | Beckhoff | |
| 6,427,099 B1 | 7/2002 | Heinemann | |
| 6,553,300 B2 | 4/2003 | Ma et al. | |
| 7,003,681 B2 | 2/2006 | Wu | |
| 7,146,470 B2 | 12/2006 | Heinemann | |
| 7,207,045 B2 | 4/2007 | Goiffon | |
| 7,272,454 B2 | 9/2007 | Wojsznis et al. | |
| 7,765,029 B2 | 7/2010 | Fleischer et al. | |
| 8,818,536 B2 | 8/2014 | Mienhardt et al. | |
| 9,152,454 B2 | 10/2015 | Holembowski et al. | |
| 9,164,796 B2 | 10/2015 | Andrianiaina et al. | |
| 9,874,868 B2 | 1/2018 | Lorenz et al. | |
| 10,331,104 B2 | 6/2019 | Hatanaka | |
| 10,782,667 B2 | 9/2020 | Tscherepanow et al. | |
| 2003/0078954 A1 | 4/2003 | Haughey | |
| 2004/0249483 A1 | 12/2004 | Wojsznis et al. | |
| 2005/0187643 A1* | 8/2005 | Sayyar-Rodsari | G05B 13/048 700/28 |
| 2012/0187889 A1 | 7/2012 | Krauskopf et al. | |
| 2014/0304709 A1 | 10/2014 | Chandhoke et al. | |
| 2015/0274433 A1* | 10/2015 | Hanisch | B65G 54/02 198/810.01 |
| 2016/0252894 A1 | 9/2016 | Kram et al. | |
| 2017/0031343 A1 | 2/2017 | Hatanaka | |
| 2018/0267496 A1 | 9/2018 | Wang et al. | |
| 2019/0102657 A1* | 4/2019 | SayyarRodsari | G06F 18/23 |
| 2019/0199189 A1* | 6/2019 | Brucker | B65G 54/02 |

FOREIGN PATENT DOCUMENTS

| | | |
|---|---|---|
| CN | 102449564 A | 5/2012 |
| CN | 103080940 A | 5/2013 |
| CN | 105278448 A | 1/2016 |
| CN | 105929789 A | 9/2016 |
| CN | 106406235 A | 2/2017 |
| CN | 107683440 A | 2/2018 |
| DE | 19648422 A1 | 6/1998 |
| DE | 10243856 A1 | 4/2004 |
| DE | 102009055752 A1 | 5/2011 |
| DE | 10113538 B4 | 3/2012 |
| DE | 102016107527 A1 | 10/2017 |
| EP | 0616706 B1 | 3/1996 |
| EP | 0498880 B1 | 10/1997 |
| EP | 0484911 B1 | 1/1998 |
| EP | 0796457 B1 | 10/1999 |
| EP | 1312990 A2 | 5/2003 |
| EP | 1585000 B1 | 9/2008 |
| EP | 2568346 B1 | 12/2015 |
| WO | 9312475 A1 | 6/1993 |
| WO | 2004059400 A1 | 7/2004 |
| WO | 2012019885 A2 | 2/2012 |
| WO | 2017182467 A1 | 10/2017 |

OTHER PUBLICATIONS

Demant, et al., "Industrial Image Processing", 3rd Edition, 2011, 11 pages.
Haban, Dieter et al. "Application of real-time monitoring to scheduling tasks with random execution times." IEEE Transactions on Software Engineering, 16.12 (1990), pp. 1374-1389.
Jahne, Bernd, "Digital image processing and Image acquisition", Z. Edition, 2012, 7 pages.
Kim, Byung Kook. "Task scheduling with feedback latency for real-time control systems," Proceedings Fifth International Conference on Real-Time Computing Systems and Applications (Cat. No. 98EX236). IEEE, 1998, pp. 1-5.
Norm IEC, "61131-3", Architectural models; Communication model, 2013, 2 pages.
Peshek, Clifford et al. "Recent developments and future trends in PLC programming languages and programming tools for real-time control." Record of Conference Papers 35th IEEE Cement Industry Technical. 1993, pp. 219-230.
Soetens, Peter et al. "Realtime hybrid task-based control for robots and machine tools." Proceedings of the 2005 IEEE International Conference on Robotics and Automation. IEEE, 2005, pp. 259-264.
Steger, Carsten, et al., "Machine Vision Algorithms and Applications", Wiley-VCH, 2008, 3 pages.
Stemmer Imaging, "The manual of the image processing", 2016, 32 pages.
Wang, Lingyun et al. "Offloading industrial human-machine interaction tasks to mobile devices and the cloud." Proceedings of the 2014 IEEE Emerging Technology and Factory Automation. IEEE, 2014, pp. 1-4.
Wei, Zhenchun et al. "A task scheduling algorithm based on Q-learning and shared value function for WSNs." Computer Networks, 126 (2007) pp. 141-149.
Wikipedia, "First In—First Out", https://en.wikipedia.org/w/index.php?title=First_In_-_First_Out&oldid=185137610, Dec. 19, 2015, 3 pages.
Wikipedia , "Machine Vision", "https://en. wikipedia.org/w /index.php?title= Machine_ vision&oldid=693224278", Dec. 1, 2015, 6 pages.
Wikipedia, "Programmable logic controller", https://en.wikipedia.org/w/index.php?title=Speicherprogrammierbare_Steuerung&oldid=184876285, Jan. 19, 2016, 13 pages.
Wikipedia, "Wrappers (software)", https://en.wikipedia.org/w/index.php?title=Wrapper_(Software)&oldid=183960630, Dec. 23, 2018, 2 pages.
Office Action dated Jan. 24, 2022 in connection with Chinese Patent Application No. 201980085309.6, 9 pages including English translation.
International Preliminary Report on Patentability dated Nov. 19, 2020 in connection with International Patent Application No. PCT/EP2019/086426, 44 pages including English translation.
International Search Report and Written Opinion dated Mar. 31, 2020 in connection with International Patent Application No. PCT/EP2019/086426, 33 pages including English translation.
Richter et al. "Model Predictive Trajectory Planning with Fallback-Strategy for an Active Heave Compensation System," 2014 American Control Conference, Jun. 4-6, 2014, Portland, OR, 6 pages.
Wills, et al. "Interior-Point Methods for Linear Model Predictive Control," Control 2004, University of Bath, UK, Sep. 2004, 6 pages.

* cited by examiner

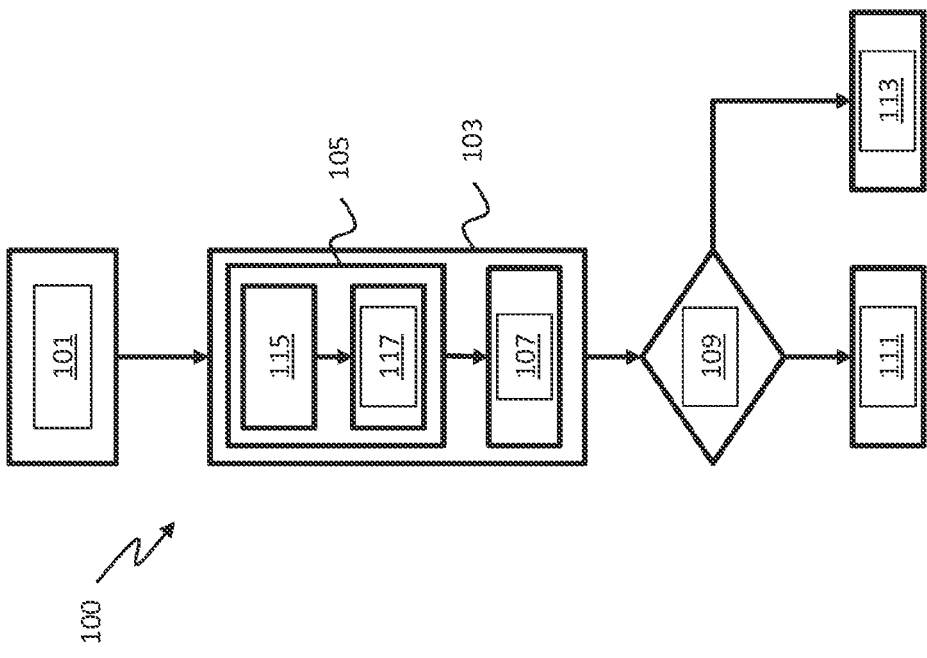
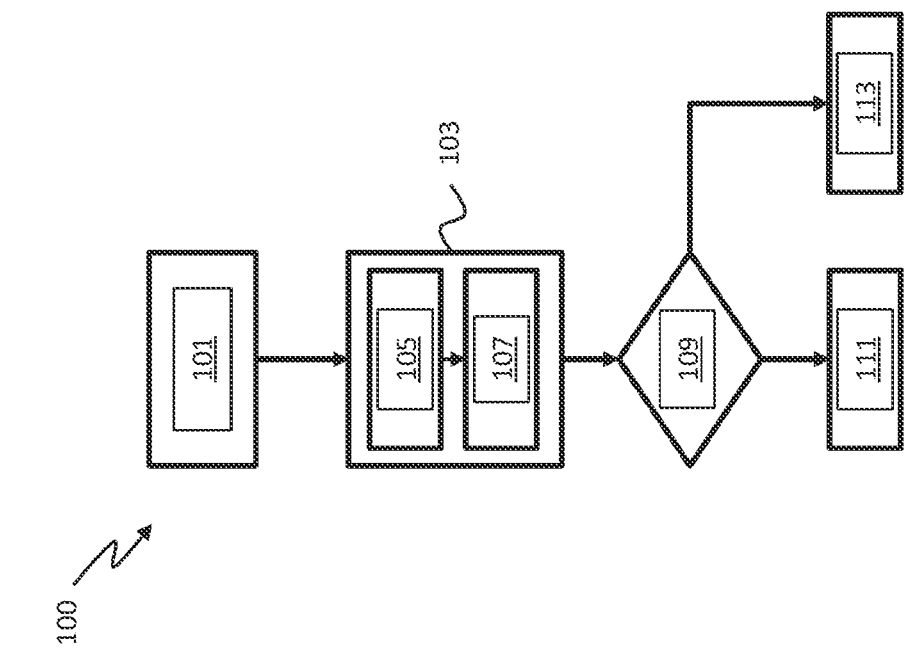

METHOD FOR CONTROLLING AN AUTOMATION PROCESS IN REAL TIME

CROSS-REFERENCE TO RELATED APPLICATIONS

This application is a continuation of International Patent Application PCT/EP2019/086426, METHOD FOR CONTROLLING AN AUTOMATION PROCESS IN REAL TIME, filed 19 Dec. 2019, which claims the priority of German patent application DE 10 2018 133 058.8, VERFAHREN ZUM STEUERN EINES AUTOMATISIERUNGSPROZESSES IN ECHTZEIT, filed 20 Dec. 2018, each of which are incorporated by reference herein, in the entirety and for all purposes.

FIELD

The application provides a method for controlling an automation process in real time. The application furthermore provides a system for controlling an automation process in real time. The application additionally provides a computer program for executing a method for controlling an automation process in real time and to a storage medium having the computer program.

BACKGROUND

In modern, highly complex automation processes, it can be important that the control is real-time capable. This requires that the respective process has a deterministic computational complexity. It can thus be ensured that a certain task or a certain process step is carried out and completed within a predetermined maximum time period.

DE 10 2016 107 527 A1 discloses a real-time environment and a programmable logic controller that enables at least one task to be processed within a specified task runtime. For this purpose, a time monitoring function defines an abort time for the task within the task runtime and causes a task to be aborted when the task runtime is exceeded.

Modern, highly complex automation processes include, among other things, a large number of different process parameters that influence the process and each other. The large number of process parameters can have the result that a large number of different parameter combinations can represent equivalent solutions for a desired process course.

It is therefore an object of modern process controls to control automation processes in a manner that is optimized with regard to predetermined optimization criteria.

Such optimization problems may be solved using methods of non-linear optimization. For example, with respective numerical approximation methods adapted to the problem, the process parameters can be approximated to a solution that fulfills or minimizes a predetermined optimization criterion.

Numerical approximation methods allow a quality guarantee of the determined results, in that the respective approximation method can be regulated to only terminate when a certain quality of the approximation result has been reached.

However, numerical approximation methods are not real-time capable, since termination of the approximation method cannot be guaranteed within a maximum time period.

A method for optimizing control parameters for a system is known from WO 93/12475 A1, which includes an actual behavior as a function of the control parameters. The document teaches the use of an artificial neural network for parameter optimization.

Artificial neural networks are real-time capable in the inference phase and have a deterministic runtime complexity that has a proportional relationship to the model complexity. The computational complexity is thus well controllable. Thus, it can be ensured that a result of the approximation method is achieved within a predetermined time period.

The quality of such a result cannot be guaranteed, however, since the approximation process of a neural network does not comprise any quality criteria.

SUMMARY

The application provides an efficient method for controlling an automation process in real time, an efficient automation system, a computer program for executing an efficient method for controlling an automation process in real time, and a storage medium having the computer program.

EXAMPLES

According to one aspect of the application, a method for controlling an automation process in real time based on a change profile of at least one process variable is provided, the method steps comprising: determining a first change profile by a real-time-capable recognition method based on a non-linear optimization process taking into consideration at least one boundary condition of the process variable, determining a change profile by a numerical algorithm based on the first change profile, comprising: adapting a selected profile function to the first change profile by a numerical adaptation process, and identifying the adapted profile function as a second change profile, checking whether the second change profile satisfies at least one secondary condition of the process variable, controlling the automation process based on the second change profile when the second change profile satisfies the at least one auxiliary condition, and controlling the automation process based on a predetermined fallback profile if the second change profile does not satisfy the at least one secondary condition.

In this way, an efficient method for controlling an automation process can be provided in real time.

The real-time-capable recognition method based on a non-linear optimization process can ensure that at least one first change profile that is suitable for controlling the automation process is provided for a given automation process within a predetermined time period.

In addition, it can be ensured that the provided change profile corresponds to at least one optimization criterion and thus results in a process course that is optimized with regard to this optimization criterion.

With a numerical algorithm, a second change profile can then be created based on the first change profile, which satisfies a boundary condition, or possibly a plurality of boundary conditions, and has the degree of optimization of the first change profile.

In this context, the numerical algorithm is designed in such a way that it can also be ensured for the numerical algorithm that it leads to a result within a predetermined time period.

The second change profile is then checked to determine whether it complies with a secondary condition, or possibly a plurality of secondary conditions, which have to be met for a safe and efficient process course. This check is also designed in such a way that successful completion of the check process is guaranteed within a predetermined time period.

The review of the second change profile can include an examination of the second change profile with regard to maximum points, minimum points, slopes, slope changes, inflection points, discontinuities, and/or the like.

The check of the second change profile can also include the creation of derivatives of the nth order of the first change profile and the check of these derivatives with regard to the features mentioned above.

The check also fulfills the real-time condition.

In the event of a positive result, the second change profile is used to control the automation process.

In the event of a negative result, a predetermined fallback profile is used to control the automation process, wherein the predetermined fallback profile fulfills the boundary condition and the secondary condition and is thus suitable for the automation process to run safely and efficiently.

The fallback profile is not optimized for the respective automation process and is not generated by the real-time capable recognition method based on a non-linear optimization process. The fallback profile is designed to fulfill the boundary condition and the secondary conditions and to be able to guarantee a secure and efficient, if not optimized, process flow.

The fallback profile is available within the predetermined time period for controlling the automation process and can be determined based on the boundary conditions and secondary conditions or taken from a corresponding database.

The control of the automation process is thus guaranteed both via the second change profile and via the fallback profile within a predetermined time period.

It is thus guaranteed that a change profile is provided for each automation process to be controlled within the time period to be observed for the real-time requirement, which profile corresponds to the boundary and secondary conditions and by which the automation process can be controlled.

It is also possible to control an automation process based on a plurality of process variables. For this purpose, for example, a plurality of change profiles can be determined, based on which the process is controlled.

In the following, an automation process is any automated work process in which a sequence of individual work steps is carried out at least partially automatically, that is to say autonomously, independently, and without the active intervention of a user of a system executing the work process. An automation process can also be understood as any self-contained subprocess of an automated work process. The self-contained subprocess forms the automated work process in cooperation with other subprocesses. This comprises, among other things, industrial-process automation processes.

In the following, real-time capability is understood to mean the capability of being able to guarantee for a process or operation that this process or operation will lead to a conclusion and a result for a predetermined time period from the beginning of the process or operation. A continuation of the process or operation beyond this time period or the non-existence of a result within the time period is, however, excluded.

A real-time-capable recognition method based on a non-linear optimization process is a process which can guarantee the output of a result for a non-linear optimization problem within a predetermined time period.

For this purpose, the real-time-capable recognition method based on a non-linear optimization process uses optimization results that were previously created by the non-linear optimization process. These created optimization results can be optimized with regard to an optimization criterion or with regard to a plurality of optimization criteria and a plurality of boundary conditions and/or secondary conditions.

A non-linear optimization process can be, for example, a numerical adaptation process having a non-linear adaptation function, in which the corresponding function parameters are varied in such a way that the adaptation function corresponds to the respective optimization criteria.

In consideration of an optimization criterion relevant to a certain automation process or a plurality of optimization criteria and at least one boundary condition relevant to the automation process, the real-time recognition method based on a non-linear optimization process reproduces the optimization results of the non-real-time non-linear optimization process in a real-time manner in order to recognize at least one result that satisfies both the optimization criterion and also the at least one boundary condition.

For this purpose, the real-time recognition method based on a non-linear optimization process recognizes an optimal result that meets all optimization criteria and boundary conditions, or a non-optimal result that only satisfies a subset, at best a majority, of the optimization criteria and boundary conditions, and outputs this optimal or non-optimal result as the result of the optimization problem.

If no optimal result is recognized, the real-time-capable recognition method based on a non-linear optimization process can generate further optimization results in a learning process in which further non-linear optimization processes are carried out in order, in a following recognition process by the real-time-capable recognition method based on a nonlinear optimization process, to recognize optimum results from the optimization results which correspond to the respective optimization criteria and boundary conditions.

The optimization results determined in the optimization processes are in the present case change profiles for certain automation processes.

In a recognition process by the real-time-capable recognition method based on a non-linear optimization process, the real-time-capable recognition method based on a non-linear optimization process recognizes, from change profiles previously determined by the non-linear optimization process, the change profiles that correspond to all the optimization criteria, boundary conditions and, if applicable, secondary conditions required by the respective automation process.

The recognition process of the real-time capable recognition method based on a non-linear optimization process is real-time capable.

The linear optimization process is not real-time capable and is carried out chronologically before the beginning of the recognition process.

In the present case, a process variable is a physical technical variable by which a specific automation process can be identified and tracked or controlled.

For example, in an automation process in which a point-to-point movement of a movable object is controlled, the position of the respective object in a corresponding coordinate system can be used as a process variable via which the course of the respective process can be tracked and controlled.

Alternatively, however, any other physical technical variable that permits statements about the course of the process and by which the process can be controlled can also be used as the process variable.

In the following, a change profile is understood to mean a course of a process variable in relation to a respective argument of the process variable. However, it is also possible to describe the courses of multiple process variables in a change profile. In such a case, the courses of individual process variables are preferably considered with regard to a uniform argument.

Usually the course of a process variable can be observed in relation to time. A corresponding change profile is therefore given by the course over time of the process variable over a predetermined time period.

In this context, the change in a process variable can also assume the value zero in a partial range or the entire range of the change profile. The process variable has a constant course in this range.

The change profile can be represented graphically by plotting the respective process variable against the corresponding argument of the process variable. The change profile thus has a certain definition range on which the profile is defined and on which the change profile has certain individual properties, such as continuity or differentiability.

A fallback profile is a change profile in the sense mentioned here that is used for a specific process if a second change profile that meets the optimization criterion as well as the boundary condition and the secondary condition cannot be found for the respective process.

The fallback profile can be created simultaneously to the determination of the first and second change profiles based on the boundary and secondary conditions, wherein no optimization process is required for this. Or the fallback profile can be selected from a set of fallback profiles that are already known and classified as suitable and, for example, stored in a corresponding database. It is thus guaranteed that the fallback profile is available within the predetermined time period.

An optimization criterion is a physical technical variable to which a change profile, and thus a course of a process variable of the automation process, is optimized by the non-real-time-capable non-linear optimization process.

An optimization criterion can be, for example, an energy consumption, a material consumption, a material load on process components, a time period of the process, a vibration excitation, and the like. Optimization criteria can vary between different automation processes.

Boundary conditions and secondary conditions are conditions that a change profile or a change in a process variable has to comply with so that the corresponding profile can be used for the planned automation process.

The boundary conditions and secondary conditions define the framework within which the values of a process variable and the changes of the process variable, including the speed and acceleration that it experiences in the course of a process, may lie without endangering the safety, the effectiveness, and/or the smooth course of the respective automation process.

In the case of subprocesses, boundary and secondary conditions can also determine the smooth interaction of individual subprocesses.

A profile function is a mathematical function that is suitable for representing a course of a process variable, i.e., a change profile of the respective process variable, in relation to a corresponding argument of the process variable.

An argument can be a physical technical variable, in relation to which a change in the process variable is determinable. An example of an argument is time.

In the following, an adaptation process is a process in which the profile function is modified by varying corresponding parameters of a profile function in such a way that the profile function corresponds to an individual set of data points or other adaptation criteria.

According to one embodiment, the real-time-capable recognition method based on a non-linear optimization process is implemented by an artificial neural network, wherein a non-linear optimization process is carried out during at least one learning process of the artificial neural network.

This has the technical advantage that real-time results can be achieved for non-linear optimization problems. In addition, via learning processes of the artificial neural network, its performance can be continuously improved until results are found which satisfy all optimization criteria and all boundary conditions and all secondary conditions.

During the learning process of the artificial neural network, a non-linear optimization process is carried out in order to find optimization results for the respective non-linear optimization problem, which satisfy at least one optimization criterion, alternatively a plurality of predetermined optimization criteria, and possibly at least one boundary condition, alternatively a plurality of predetermined boundary conditions, and/or at least one secondary condition, alternatively a plurality of predetermined secondary conditions.

In a recognition process of the artificial neural network in which an optimal result is to be found for at least one optimization criterion, alternatively for a plurality of optimization criteria and for at least one boundary condition, alternatively for a plurality of boundary conditions, and/or for at least one auxiliary condition, alternatively for a plurality of auxiliary conditions, which satisfies all optimization criteria, boundary conditions, and secondary conditions, the artificial neural network recognizes, from the previously determined optimization results of the nonlinear optimization process, an optimization result which satisfies all optimization criteria, all boundary conditions, and all secondary conditions, and outputs this result as the optimal result of the optimization problem.

If the artificial neural network does not recognize an optimal result which satisfies all optimization criteria, all boundary conditions, and all secondary conditions, the artificial neural network recognizes a result based on a previously determined weighting which satisfies at least a subset, at best a majority of the optimization criteria, a subset, at best a majority of the boundary conditions, and a subset, at best a majority of the secondary conditions, and outputs this result as the result of the optimization problem.

The weighting can be determined during the learning process of the artificial neural network.

During the learning process of the artificial neural network, non-linear optimization processes can be carried out in order to determine further optimization results that correspond to further optimization criteria and, if necessary, further boundary conditions and further secondary conditions, so that in the following recognition processes, the artificial neural network recognizes optimal results from the determined optimization results that satisfy all optimization criteria, all boundary conditions, and all secondary conditions.

Various process variables can also be taken into consideration in the non-linear optimization processes.

The optimization results determined in the optimization processes are in the present case change profiles for certain automation processes.

In a recognition process by the artificial neural network, the artificial neural network recognizes, from change profiles previously determined by the non-linear optimization process, the change profiles that correspond to all of the optimization criteria, boundary conditions, and, if applicable, secondary conditions required by the respective automation process.

According to one embodiment, adapting the selected profile function to the first change profile by the numerical adaptation process comprises the following method steps: determining at least one data point of the first change profile, and adapting the selected profile function to the at least one data point of the first change profile and to the at least one boundary condition.

This enables an adaptation of the profile function to the first change profile which is easy to carry out, in that the profile function is modified by a suitable adaptation algorithm in such a way that it corresponds to the at least one data point.

In the present case, a data point is an ordered pair of values consisting of an argument value and the associated value of the respective process variable. A data point thus corresponds to a point on a change profile of the respective process variable for a given argument value.

According to one embodiment, the method for controlling an automation process in real time furthermore comprises the method step of determining the at least one boundary condition and the at least one secondary condition.

This achieves the technical advantage that boundary conditions and secondary conditions are individually determinable for any automation processes and any process variables.

According to one embodiment, the method step of determining a first change profile comprises the method step of determining the first change profile by a real-time-capable recognition method based on a non-linear optimization process, taking into consideration the at least one boundary condition and the at least one secondary condition.

The technical advantage is thus achieved that a precise determination of an optimized first change profile can be achieved. Due to the incorporation of the information of the at least one secondary condition into the real-time-capable recognition method based on a non-linear optimization process, an optimized first change profile is achievable that satisfies the at least one secondary condition.

According to one embodiment, the method for controlling an automation process in real time furthermore comprises the method step of generating the feedback profile based on the at least one boundary condition and the at least one secondary condition.

The technical advantage is thus achieved that fallback profiles can be provided for any automation processes and any process variables that satisfy the at least one boundary condition and the at least one secondary condition.

If the determination of a second change profile that satisfies the at least one boundary condition and the at least one secondary condition fails, stopping the automation process can be avoided and safely starting or continuing the automation process is enabled. The process variable meets the conditions for a safe and problem-free process course in this case.

According to one embodiment, the selected profile function is a quintic spline and is continuously differentiable at least twice.

With the quintic spline, a profile function is provided having a comparatively low complexity that is easy to handle.

With a spline interpolation, the adaptation of the profile function to the first change profile or to the data points of the first change profile can be simplified and thus accelerated, so that compliance with the real-time conditions can be fulfilled.

The at least 2-fold continuous differentiability can in turn ensure that the second change profile is continuously differentiable at least twice.

In the following, a spline function is to be understood as a mathematical function that is pieced together from polynomials. A quintic spline is a special embodiment of a spline function.

According to one embodiment, the second change profile is continuously differentiable at least twice.

The technical advantages thus achieved that when the process variable is changed in accordance with the second change profile, it can be ensured that both the change of the process variable and the speed and the acceleration at which the change in the process variable is effectuated have a steady course. In this way, jumps in the course of the change of the process variable, the speed, or the acceleration can be avoided.

A uniform process course can thus be achieved in which no jerky or sudden changes in the process variable or the speed or acceleration occur.

According to one embodiment, the at least one boundary condition is a starting value of the process variable, a starting speed, a starting acceleration, an end value of the process variable, an end speed, an end acceleration, and a length of the change profile.

It can be ensured in this way that the automation process begins with certain starting conditions and ends with certain end conditions. This is particularly important if the automation process is a cyclical process in which the starting value of the process variable corresponds to the end value of the process variable of a previous automation process.

In the following, speed is understood to mean a change in the process variable according to the respective argument. The speed may therefore be determined by the first derivative of the corresponding change profile according to the respective argument.

An acceleration is therefore a change in the speed according to the respective argument and may be determined by the second derivative of the respective change profile according to the argument.

The use of the terms speed and acceleration in this context is not to imply that only changes in the process variable position in relation to the argument time are considered. In the following, the terms speed and acceleration refer to changes in any process variable in relation to any argument.

The length of a change profile is determined in the following by a range of the argument of the change profile in which the change profile is defined. The range of the argument is determined by a starting value of the argument at which the automation process controlled by the respective change profile begins, and an end value at which the automation process ends.

If, for example, the time is selected as the argument of the change profile for a process to be controlled using a change profile, the length of the change profile describes the time period from a starting time to an end time in which the respective process is controlled via the change profile.

According to one embodiment, the at least one secondary condition is a maximum value of the process variable, a minimum value of the process variable, a maximum speed, a minimum speed, a maximum acceleration, or a minimum acceleration of the course of the process variable.

This can ensure that a framework is given for the process variable, for the course of the process variable, including the speed and acceleration of the course, within which the process course runs without problems and uncritically.

According to one embodiment, the maximum value and/or the minimum value of the process variable is a function of an argument of a change profile.

This increases the applicability of the method.

According to one embodiment, the fallback profile satisfies the at least one boundary condition and the at least one secondary condition and is continuously differentiable at least twice.

This can ensure that when the fallback profile is used to control the automation process, it can be ensured that the at least one boundary condition and the at least one secondary condition, which are obligatory for the automation process to run safely and efficiently, are complied with.

Furthermore, the twofold continuous differentiability of the fallback profile can be used to ensure that neither the course of the process variable according to the fallback profile nor the speed and the acceleration have any jumps or singularities. This can prevent a jerky or sudden change in the process variable during the course of the automation process.

In one embodiment, the real time is a hard real time.

This can ensure that for each automation process, or before each planned change to a process variable according to a change profile, a corresponding second change profile that corresponds to the corresponding boundary conditions and constraints, or at least one corresponding fallback profile that also corresponds to the respective boundary conditions and conditions, can be provided within a predetermined time period.

In the following, a hard real time is to be understood as a real-time requirement that states that exceeding a previously determined response time is assessed as a failure of the respective process.

According to a second aspect of the application, an automation system having a process unit for executing an automation process and a control unit for controlling the process unit is provided, wherein the control unit is designed to execute a method for controlling an automation process in real time.

The technical advantage is thus achieved that an automation system can be provided by which an automation process can be controlled in real time.

According to one embodiment, the automation system is a linear transport system, wherein the process unit comprises: at least one linear transport device for executing a transport movement, at least one running rail for guiding the linear transport device in a predetermined linear path movement, and a drive unit for driving the at least one linear transport device on the at least one running rail.

A linear transport system can be provided in this way, in which the control of each linear transport process can be carried out in real time.

According to one embodiment, the linear transport device is designed as a carriage, in particular as a mover.

This achieves the advantage of a transport device that can be guided securely on the running rail.

According to a further embodiment, the automation system is a planar transport system, wherein the process unit comprises: at least one planar transport device for executing a transport movement, at least one planar path element for guiding the planar transport device in a predefined two-dimensional guide area in which the planar transport device can execute any transport movement, and a drive unit for driving the at least one planar transport device on the at least one planar path element.

A planar transport system can be provided in this way, in which the control of each planar transport process can be carried out in real time.

According to one embodiment, the planar transport device is designed as a planar carriage, in particular as a planar mover.

This achieves the advantage of a planar transport device which can be guided securely on the planar path element.

According to one embodiment, the planar transport device is designed to carry out a one-dimensional, two-dimensional, or three-dimensional transport movement.

This achieves the advantage of an increased area of application. According to one embodiment, the process variable is a position of the linear transport device and/or the planar transport device in a coordinate system, wherein the at least one boundary condition comprises at least a starting position, a starting speed, a starting acceleration, a starting direction, an end position, an end speed, an end acceleration, and an end direction of the linear transport device and/or the planar transport device, and wherein the at least one secondary condition comprises a maximum position, a minimum position, a maximum speed, a minimum speed, a maximum acceleration, and a minimum acceleration of the linear transport device and/or the planar transport device.

This enables a simple, safe, and efficient control of a transport process of the linear or planar transport system.

According to a third aspect, a computer program is provided which comprises commands which, when the computer program is executed by a computer or the control unit, cause the computer or the control unit to execute a method for controlling an automation process in real time.

According to a fourth aspect of the present application, a machine-readable storage medium is provided on which the computer program according to the application is stored.

BRIEF DESCRIPTION OF THE DRAWINGS

The application is explained in greater detail hereinafter based on preferred embodiments. In the figures:

FIG. 1 shows a flow chart of a method for controlling an automation process in real time according to a first embodiment;

FIG. 2 shows a flow chart of a method for controlling an automation process in real time according to a further embodiment;

DETAILED DESCRIPTION

Figure 3:
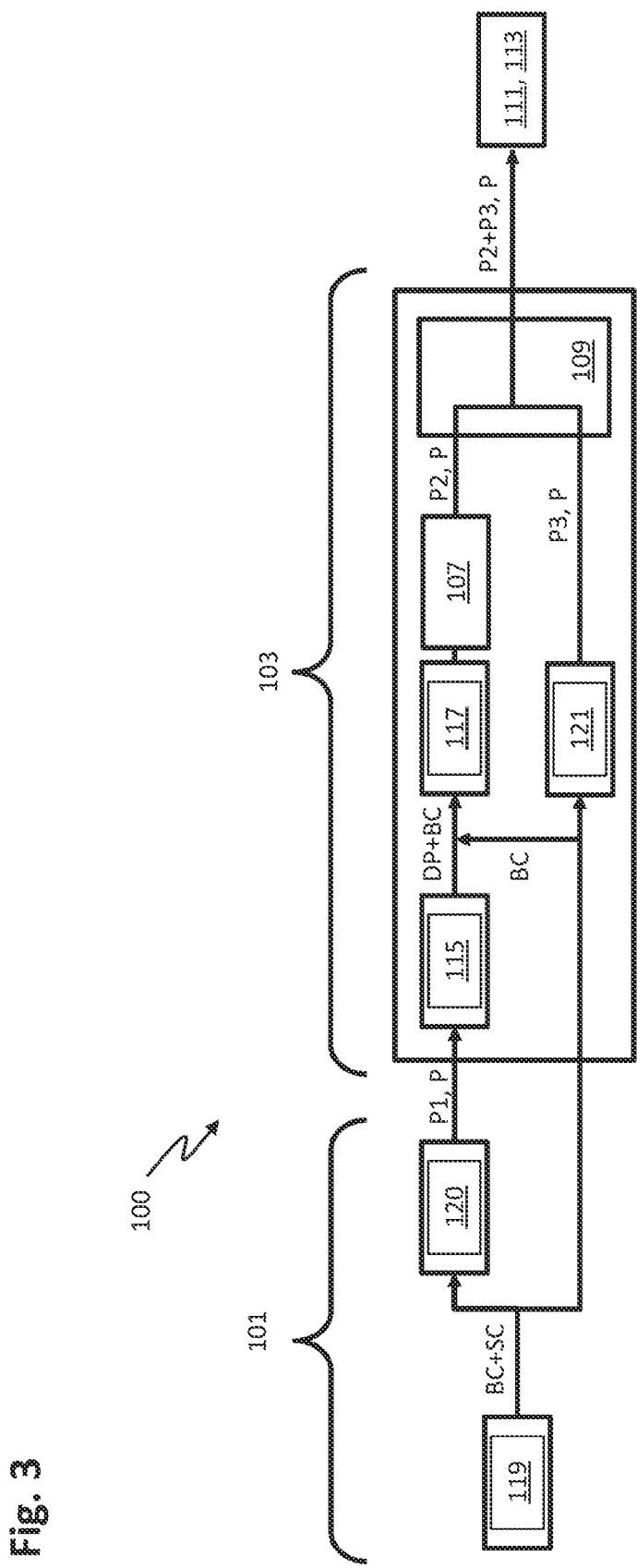
FIG. 3 shows a flow chart of a method for controlling an automation process in real time according to a further embodiment.

FIG. 1 shows a flowchart of the method 100 for controlling an automation process in real time according to a first embodiment, wherein the control of the automation process is carried out based on a change profile P, which is referred to in the following as the first change profile P1, the second change profile P2, the fallback profile P3, and/or in general as the change profile P, and at least one process variable PV.

According to FIG. 1, the method 100 for controlling an automation process in real time comprises the method steps: determining 101 a first change profile P1 by a real-time-capable recognition method based on a non-linear optimization process taking into consideration at least one boundary condition BC of the process variable PV, determining 103 a second change profile P2 by a numerical algorithm based on the first change profile P1, comprising: adapting 105 a selected adaptation function PF to the first change profile P1 by a numerical adaptation process, and identifying 107 the adapted profile function PF as a second change profile P2, checking 109 whether the second change profile P2 satisfies at least one secondary condition SC of the process variable PV, controlling 111 the automation process based on the second change profile P2 if the second change profile P2 satisfies the at least one secondary condition SC, and controlling 113 the automation process based on a predetermined fallback profile P3 if the second change profile P2 does not satisfy the at least one secondary condition SC.

In the method 100 for controlling any automation process, in a first method step 101, a first change profile P1 is determined by a real-time-capable recognition method based on a non-linear optimization process, taking into consideration at least one boundary condition BC of a process variable PV.

In the present case, the process variable PV is a physical technical variable by which the respective automation process can be identified, tracked, or controlled. For example, in a transport process in which a transport device executes transport movements, the process variable PV can be a position of the movable transport device.

In this context, a change profile P of the process variable PV describes the change or the course of the process variable PV in relation to an argument X of the process variable PV. The change in the process variable PV can also assume the value zero and the process variable PV can thus have a constant course.

The argument X can, for example, be the time, so that in this case the change profile P describes a course of the process variable PV over time. A change profile P can, however, also describe a course of the process variable PV for any other argument X.

In order to ensure that the automation process runs efficiently and safely, the process variable PV can fulfill certain boundary conditions BC. Such boundary conditions BC are dependent on the respective automation process and the respective process variable PV.

For example, for a transport process in which a movable transport device is controlled and in which the process variable PV is a position of the transport device in a coordinate system, the boundary conditions BC can be starting positions and end positions as well as starting speeds and end speeds as well as starting accelerations, final accelerations, and directions of movement of the transport device.

To determine such a first change profile P1, a real-time-capable recognition method based on a non-linear optimization process is carried out in the first method step 101.

During the non-linear optimization process, optimization results of an optimization problem are created that satisfy at least one optimization criterion, alternatively a plurality of optimization criteria, at least one boundary condition, alternatively a plurality of boundary conditions, and at least one secondary condition, alternatively a plurality of secondary conditions.

The optimization results of the non-linear optimization process are in the present case change profiles P for different process variables PV and different optimization criteria, boundary conditions BC, and secondary conditions SC.

The non-linear optimization process can be a numerical adaptation process in which the parameters of an adaptation function are varied in such a way that the adaptation function satisfies the corresponding optimization criteria, boundary conditions, and secondary conditions.

In a recognition process, the real-time recognition method based on a non-linear optimization process recognizes a result from the optimization results previously determined by the non-linear optimization process, which satisfies all optimization criteria, all boundary conditions, and all secondary conditions, and determines this optimization result as the result of the optimization process.

In other words, the real-time-capable recognition method based on a non-linear optimization process recognizes, from the change profiles P previously determined by the non-linear optimization process, a change profile P that satisfies all optimization criteria, all boundary conditions, and all secondary conditions of the respective automation process, and identifies this change profile P as the first change profile P1.

For the case in which no such change profile P is recognized that fulfills all optimization criteria, all boundary conditions BC, and all secondary conditions SC, a change profile P is recognized that fulfills at least part of the optimization criteria, boundary conditions BC, and secondary conditions SC, and is identified as the first change profile P1.

For this purpose, certain weighting criteria can be taken into consideration, according to which it is determined which of the change profiles P that do not fulfill all optimization criteria, do not fulfill all boundary conditions, or do not fulfill all secondary conditions is recognized as the first change profile P1.

The recognition process by the real-time recognition method based on a non-linear optimization process thus comes to a result, even if no change profile P is recognized that corresponds to all optimization criteria, all boundary conditions, and all secondary conditions.

Since the non-linear optimization process is carried out and completed before the recognition process, the recognition process of the real-time recognition method based on a non-linear optimization process is real-time capable.

For example, an artificial neural network can be used as a real-time-capable recognition method based on a non-linear optimization process. The artificial neural network can preferably be designed in such a way that the non-linear optimization process is carried out during a learning process of the artificial neural network.

In a real-time-capable recognition process, the artificial neural network thus recognizes a change profile P from the change profiles P previously determined by the non-linear optimization process, which profile has the appropriate process variable PV and satisfies the optimization criterion and the at least one boundary condition BC corresponding to the respective automation process, and identifies this change profile as the first change profile P1.

If the artificial neural network does not recognize such a change profile P that satisfies all optimization criteria, boundary conditions BC, and secondary conditions SC, the artificial neural network recognizes a change profile P according to previously determined weighting criteria that satisfies at least a subset of the optimization criteria, boundary conditions BC, and secondary conditions SC, and outputs this change profile P as the result of the recognition process as the first change profile P1.

In learning processes of the artificial neural network, further non-linear optimization processes can be carried out in order to determine additional change profiles P which satisfy additional and different optimization criteria, boundary conditions, and secondary conditions.

The more change profiles P for various optimization criteria, boundary conditions BC, secondary conditions SC, process variables PV, and other parameters are determined by the non-linear optimization processes carried out during the learning processes of the artificial neural network, the better the change profiles P recognized by the artificial neural network in corresponding recognition processes satisfy the respective optimization criteria, boundary conditions, and secondary conditions.

The non-linear optimization process is not real-time capable. However, since the non-linear optimization process is carried out during a learning process of the artificial neural network and is thus already completed at the beginning of the recognition process by the artificial neural network, the recognition process of the artificial neural network is real-time capable.

The artificial neural network can thus generate an optimized first change profile P1 of the process variable PV in real time with input of the process variable PV and the boundary condition BC or a plurality of boundary conditions BC and taking into consideration one optimization criterion or multiple optimization criteria.

In this context, the optimization criterion expresses the criterion with respect to which a specific automation process is to be optimized. Examples of optimization criteria can be the energy consumption or the material consumption of an automation process, the duration of a process, or the wear of the process components. The optimization criterion is closely related to the goal and the type of the respective automation process.

Since, due to the design of the artificial neural network and its property that the network arrives at a result after a predetermined time period, regardless of how complex the optimization process is or how inadequate the starting information or the learning status of the network are, the results of the optimization process can be of differing quality and therefore have to be checked.

In a second method step 103, a second change profile P2 is determined by a numerical algorithm based on the first change profile P1.

For this purpose, in a third method step 105, a selected profile function PF is adapted to the first change profile P1 by a numerical adaptation process.

In this context, a profile function PF is a mathematical function which is capable of describing the first change profile P1. For example, a profile function PF can be a quintic spline.

The numerical adaptation process in the third method step 105 is in the present context a fit process in which the course of the profile function PF is approximated to the course of the respective first change profile P1 by varying parameters of the profile function PF. The adaptation of the selected profile function PF to the first change profile P1 of the third method step 105 is carried out by a numerical approximation method. For example, the adaptation can be carried out by a spline interpolation.

During the adaptation of the selected profile function PF to the first change profile P1 in the third method step 105, it is taken into consideration that the profile function PF fulfills the boundary conditions BC.

The adaptation of the selected profile function PF to the first change profile P1 in the third method step 105 thus results in a profile function PF which satisfies the at least one boundary condition BC and has a course that approximates that of the first change profile P1.

The course of the adapted profile function PF thus represents a change profile P which fulfills the boundary conditions BC and has almost the same degree of optimization as the first change profile P1. Due to the deviations of the profile function PF from the first change profile P1, for example in the boundary conditions BC, the profile function PF does not achieve the degree of optimization of the first change profile P1.

The individual course of the first change profile P1 reflects the degree of optimization of the first change profile P1 with regard to the optimization criterion or the optimization criteria. A profile that corresponds to this course is optimized with respect to the optimization criterion to almost the same extent as the first change profile P1.

Subsequently, in a fourth method step 107, the adapted profile function PF is identified as a second change profile P2. The second change profile P2 is therefore optimized with respect to the optimization criterion according to the real-time capable recognition method based on a nonlinear optimization process and fulfills the boundary conditions BC.

In a fifth method step 109, the second change profile P2 is checked to determine whether it fulfills further secondary conditions SC in addition to the boundary conditions BC.

These secondary conditions SC can be, for example, a maximum value or minimum value of the process variable PV, a maximum speed or minimum speed, or a maximum acceleration or minimum acceleration of the course of the process variable PV.

If the check in the fifth method step 109 shows that the second change profile P2 fulfills the at least one secondary condition SC, then in a following sixth method step 111 the automation process is controlled based on the second change profile P2.

If, on the other hand, the check in the fifth method step 109 shows that the second change profile P2 does not fulfill at least one secondary condition SC, the fulfillment of the boundary condition BC can be ensured by the adaptation in the third method step 105 of the profile function PF, in a seventh method step 113, the second change profile P2 is discarded and the automation process is controlled based on a fallback profile P3.

The fallback profile P3 is designed in such a way that it fulfills both the boundary conditions BC and the secondary conditions SC, but is not optimized with regard to the at least one optimization criterion.

The fallback profile P3 can be generated individually with regard to the boundary conditions BC and the secondary conditions SC. However, the fallback profile P3 is not determined by the real-time-capable recognition method based on a non-linear optimization process. Alternatively, fallback profiles P3 that have already been generated and, for example, are stored in a corresponding database can be used for each automation process.

The respective automation process is controlled using a second change profile P2 or a fallback profile P3 by varying a process variable PV in accordance with the respective change profile P2, P3.

FIG. 2 shows a flow chart of the method 100 for controlling an automation process in real time according to a further embodiment.

In comparison to FIG. 1, the method 100 in FIG. 2 differs in that the adaptation of the selected profile function PF to the first change profile P1 by the numerical adaptation process in the third method step 105 includes two further method steps.

In an eighth method step 115, at least one data point DP of the first change profile P1 is determined.

In this context, a data point DP is a pair of values consisting of a value of the argument X and a corresponding value of the process variable PV along the first change profile P1.

Depending on the complexity of the first change profile P1, a plurality of data points DP can also be determined in order to be able to take into consideration all the characterizing points of the first change profile P1 by the data points DP.

In a subsequent ninth method step 117, the above-mentioned profile function PF is adapted to the boundary conditions BC and the data point DP or the data points DP.

The ninth method step 117 for adapting the profile function PF to the selected data points DP and the boundary conditions BC is carried out according to the adaptation process described in FIG. 1 in the third method step 105, for example by performing a spline interpolation of the data points DP and the boundary conditions BC.

After the adaptation of the profile function PF to the at least one data point DP according to the ninth method step 117, the method 100 is continued according to the fourth method step 107, fifth method step 109, and sixth method step 111 or seventh method step 113 described under FIG. 1.

FIG. 3 shows a flow chart of the method 100 for controlling an automation process in real time according to a further embodiment.

In a departure from the embodiments described in FIGS. 1 and 2, the first method step 101 includes two further method steps.

First, in a tenth method step 119, the at least one boundary condition BC and the at least one secondary condition SC are determined.

In this context, the boundary conditions BC and secondary conditions SC can either be individually adapted to the respective automation process and the respective process variable PV and generated independently by a user of the method 100. It would also be conceivable that the respective boundary conditions BC and secondary conditions SC are taken from a database. It would also be possible that the method 100 independently generates the boundary conditions BC and secondary conditions SC, with knowledge of the automation process and with knowledge of corresponding properties of the respective hardware components of the automation system.

In an eleventh method step 120, a first change profile P1 is created using the real-time-capable recognition method based on a non-linear optimization process, taking into consideration the boundary conditions BC and the secondary conditions SC.

In the following, in the eighth method step 115 at least one data point DP of the first change profile P1 is determined, in the ninth method step 117 a selected profile function PF is adapted to the at least one data point DP and the at least one boundary condition BC, and in the fourth method step 107 the adapted profile function PF identified as the second change profile P2.

Before or in parallel with respect to the determination of the second change profile P2 in the fourth method step 107, a fallback profile P3 is determined in a twelfth method step 121 based on the boundary conditions BC and the secondary conditions SC.

The fallback profile P3 can be generated individually for each automation process in this case. It would also be conceivable that the fallback profile P3 is selected from a plurality of already known and stored profiles.

In the following, according to the previous embodiments, the second change profile P2 is checked with regard to the fulfillment of the secondary conditions SC in the fifth method step 109 and the automation process is controlled either in the sixth method step 111 using the second change profile P2 if it fulfills the secondary conditions SC, or in the seventh method step 113 is controlled using the fallback profile P3 if the second change profile P2 does not fulfill the secondary conditions SC.

Figure 14:
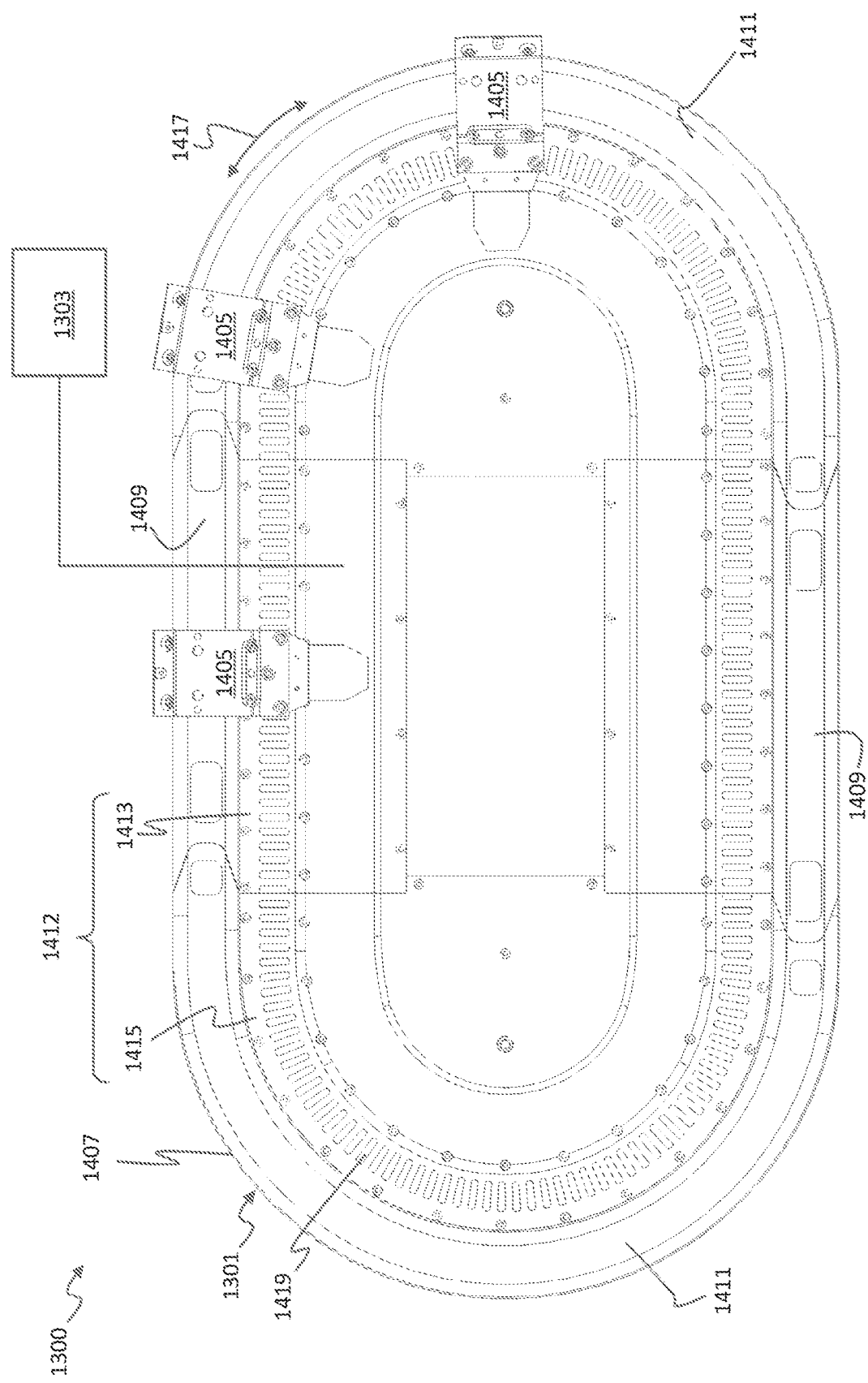
FIG. 14 shows a schematic illustration of an automation system for carrying out an automation process according to a further embodiment.
Figure 15:
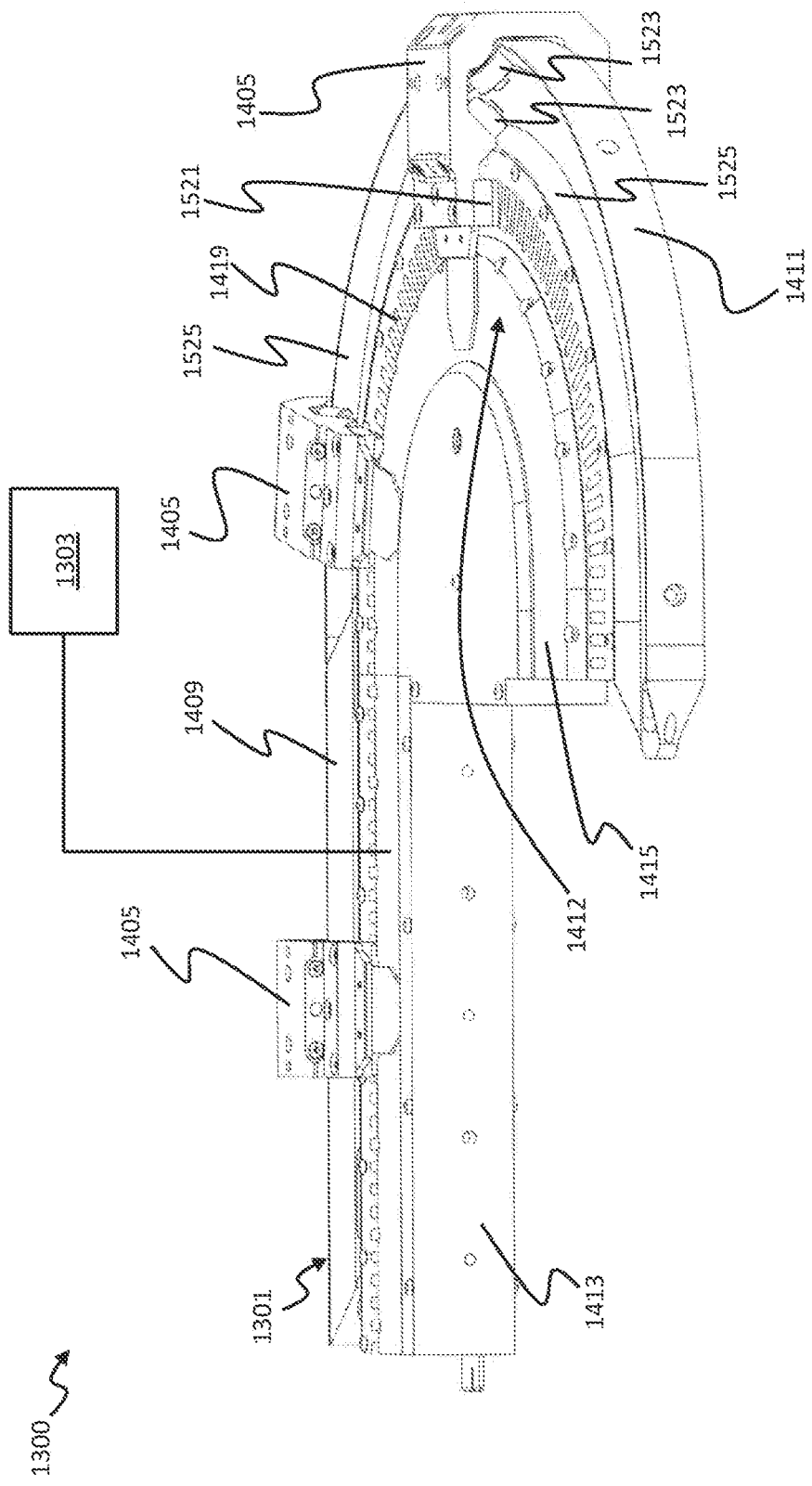
FIG. 15 shows a perspective schematic partial illustration of the automation system in FIG. 14.

In the following, the above-described method 100 for controlling an automation process in real time is described again in more detail on the basis of a further embodiment. In the embodiment shown below, the automation process is a linear transport process carried out by a transport system as shown in FIGS. 14 and 15. For this purpose, a linear transport device 1405 is designed to be movable along a predetermined running rail 1407 in order to carry out transport processes.

In this embodiment, the position of the linear transport device 1405 within a corresponding coordinate system is selected as the process variable PV. The position is preferably determined in relation to the predetermined running rail 1407, so that the position of the linear transport device 1405 on the running rail 1407 is expressed by the process variable PV.

Time is selected as argument X for the process variable PV. A change profile P thus describes the course over time of the position of a linear transport device 1405 on a running rail 1407.

FIG. 4 to FIG. 10 each show a position-time diagram to graphically illustrate a method step of the method 100 for controlling an automation process according to the embodiment mentioned.

Figure 4:
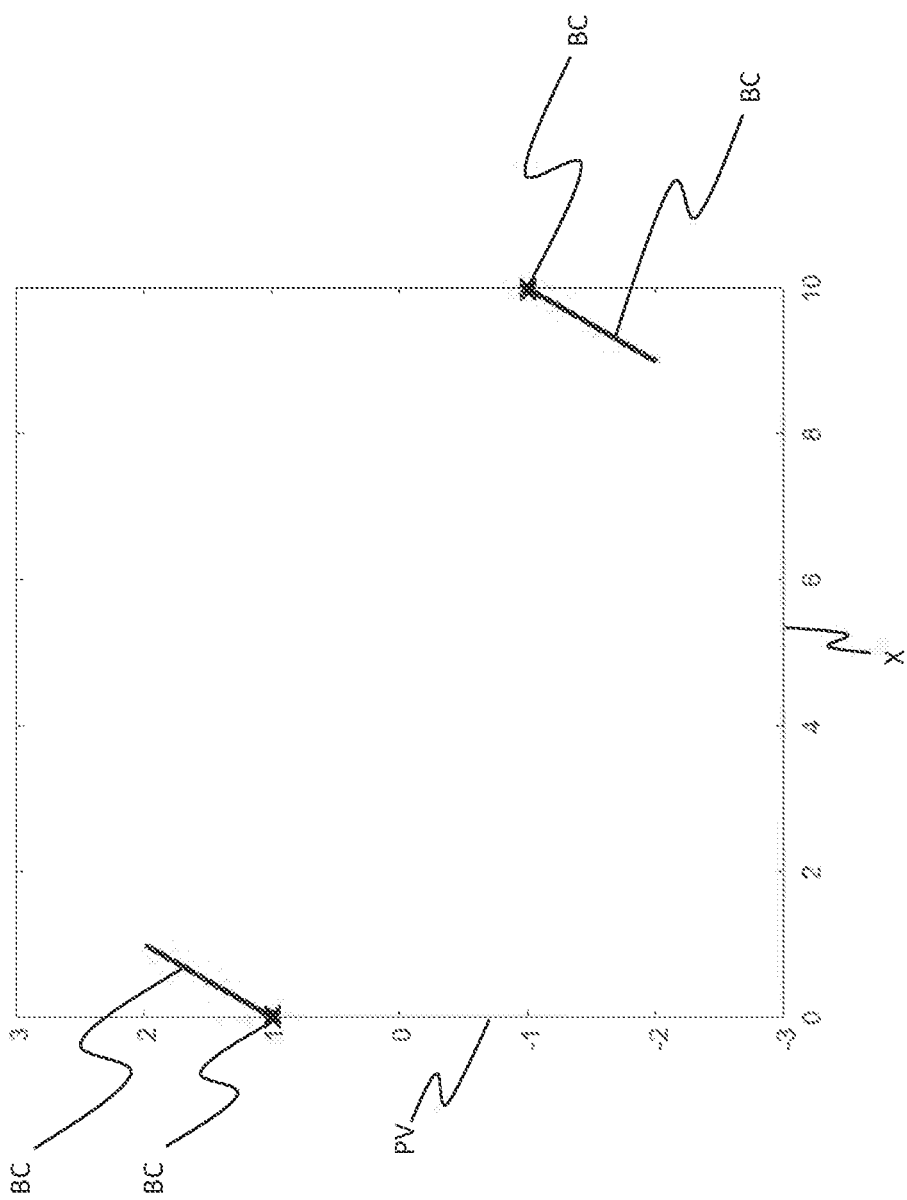
FIG. 4 shows a position-time diagram to graphically illustrate a method step of the method for controlling an automation process according to one embodiment.

In FIG. 4, according to a tenth method step 119, the boundary conditions BC are determined.

In the present embodiment, the boundary conditions BC include a starting position and an end position of the linear transport device 1405. The starting and end positions are each represented by a cross for the argument values X=0 and X=10, wherein the argument values X=0 and X=10 symbolize the beginning and end of the transport process in the present case.

Furthermore, the boundary condition BC comprises a starting dynamic and an end dynamic, which are each characterized by a straight line beginning in the starting position or ending in the end position, respectively.

The starting and end dynamics each include starting and end speeds and starting and end accelerations and the direction of movement of the linear transport device 1405.

The starting and end speeds may be determined from the slopes of the straight solid lines.

The starting and end accelerations may be determined from the curvatures of the straight solid lines.

The starting and end directions result from the slope of the solid lines, wherein a positive slope describes a movement in a first direction and a negative slope describes a movement in a second direction opposite to the first direction.

In the embodiment shown in FIG. 4, the starting and end speeds are identical, which is clear from the parallelism of the respective lines, and have a constant value not equal to zero. The starting and end accelerations therefore assume the value zero. The movement described here is a uniform, non-accelerated movement.

In the present case, therefore, a transport process is described in which, at the beginning of the process and at its end, the linear transport device 1405 is already and is still in motion. The process described here is therefore to be understood as a subprocess in which only part of the transport movement of the linear transport device 1405 is controlled.

However, the speeds and accelerations shown here are for illustrative purposes only and do not describe any real movement of a linear transport device 1405 on a running rail.

Figure 5:
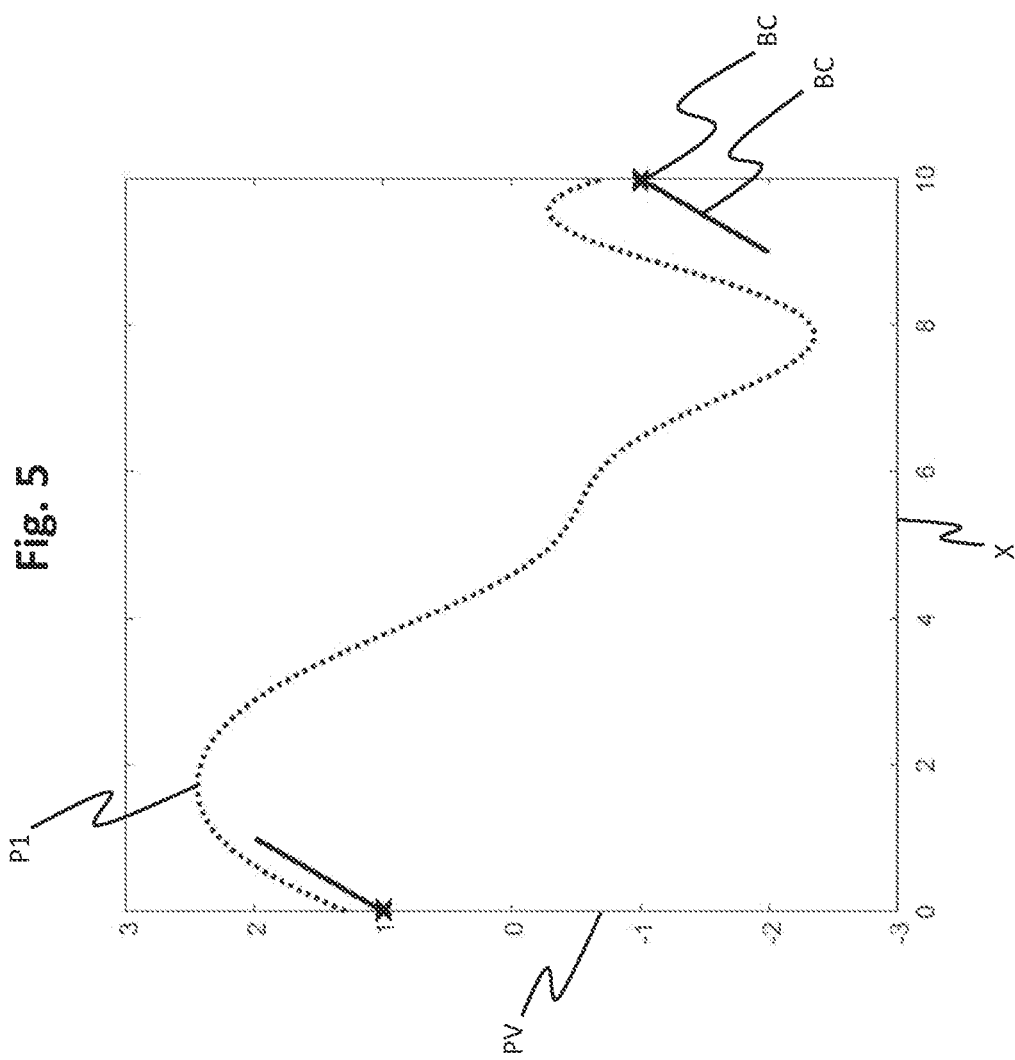
FIG. 5 shows a position-time diagram to graphically illustrate a further method step of the method for controlling an automation process according to one embodiment.

In FIG. 5, according to a first method step 101, a first change profile P1 is determined by the real-time-capable recognition method based on a non-linear optimization process. In the embodiment shown, the real-time-capable recognition method based on a non-linear optimization process is implemented by an artificial neural network, in the learning process of which a non-linear optimization process is carried out.

The first change profile P1 is represented by the dotted curve and describes the course over time of the position of the linear transport device 1405 on the running rail 1407 from the beginning to the end of the transport process to be controlled.

The course of the first change profile P1 expresses the degree of optimization of the first change profile P1 in relation to certain optimization criteria according to which the real-time-capable recognition method based on a non-linear optimization process for determining the first change profile P1 was carried out in the first method step 101 or in the eleventh method step 120.

However, the first change profile P1 shown here is only used for illustration and does not describe any actual transport movement of a linear transport device 1405. The first change profile P1 shown here is also not optimized with regard to a specific optimization criterion. Rather, the course of the first change profile P1 shown here is chosen arbitrarily and without the intention of using the shown first change profile P1 to describe a real situation of a real automation process.

Furthermore, FIG. 5 shows that the first change profile P1 does not fulfill the boundary conditions BC. In the present case, the first change profile P1 does not reach the beginning and end positions and deviates in the end speed.

In addition, the first change profile P1 deviates at least in the end direction of the linear transport device 1405. The end direction means the direction of the linear transport device 1405 in which the linear transport device 1405 arrives at the end position.

In FIG. 5, the first change profile P1 has a positive slope at the starting point and thus describes a starting movement of the linear transport device 1405 in the first direction. The positive slope of the first change profile P1 at the starting point largely corresponds to the slope of the straight line of the boundary conditions BC at the starting point.

At the end point, however, the first change profile P1 has a negative slope and thus describes a movement of the linear transport device 1405 in the second direction. In contrast to this, the straight line of the boundary conditions BC has a positive slope at the end point. The boundary conditions thus provide that the linear transport device 1405 arrives at the end point in one movement in the first direction.

Such deviations of the first change profile P1 can be traced back to intrinsic errors of real-time-capable recognition methods based on a non-linear optimization process, in particular artificial neural networks.

Depending on the degree of training of the artificial neural network, the results of the recognition processes can satisfy the boundary conditions BC and secondary conditions SC better or worse.

Figure 6:
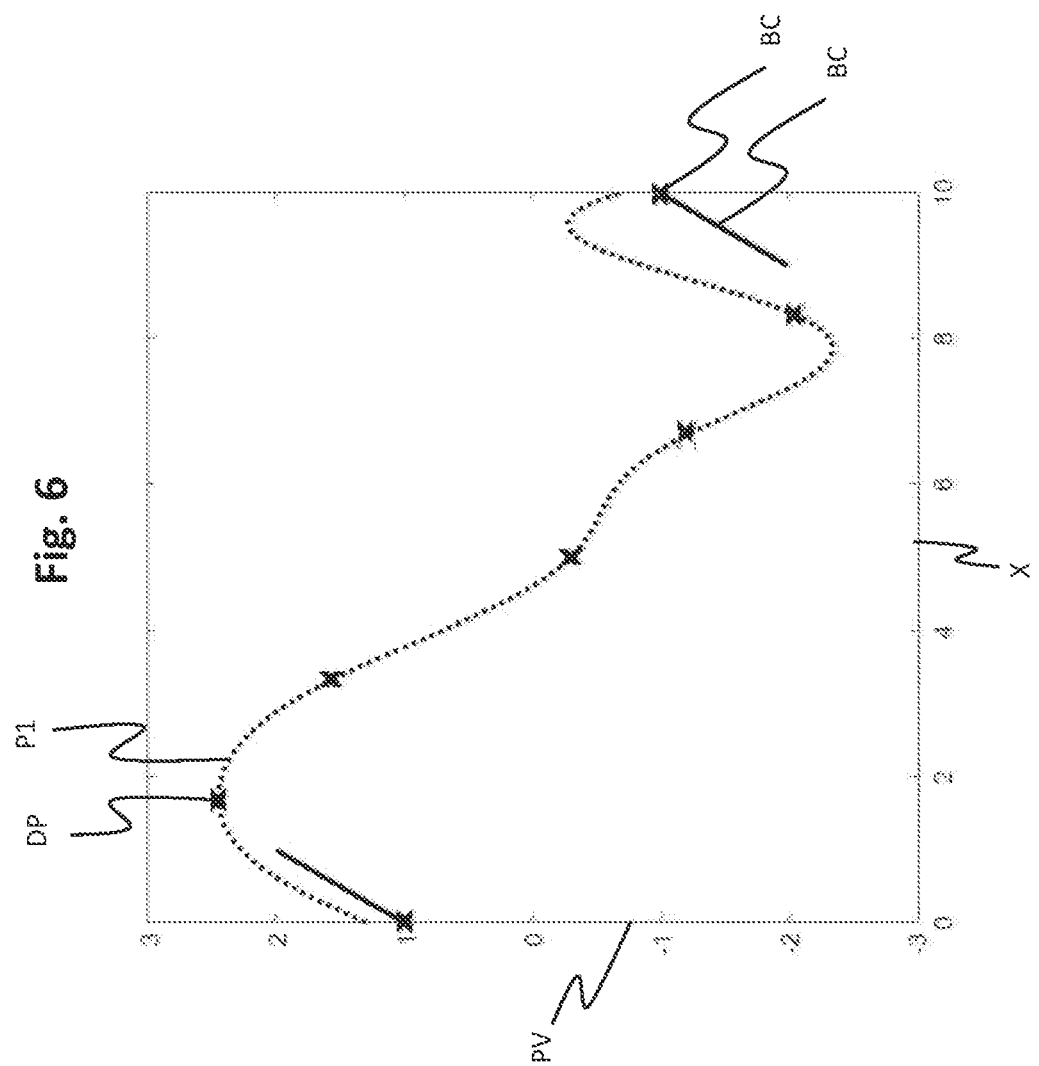
FIG. 6 shows a position-time diagram to graphically illustrate a further method step of the method for controlling an automation process according to one embodiment.

In FIG. 6, according to an eighth method step 115, a plurality of data points DP (crosses) of the first change profile P1 (dotted curve) is determined.

As shown, each data point DP assigns a specific time X to a position PV corresponding to the first change profile P1. The data points DP can be determined individually at arbitrary points of the first change profile P1.

Alternatively, the data points DP can be set at equidistant intervals. In addition, the number of data points DP can be varied depending on the complexity of the respective first change profile P1 in order to be able to ensure that all the characteristic points of the first change profile P1 are taken into consideration.

Figure 7:
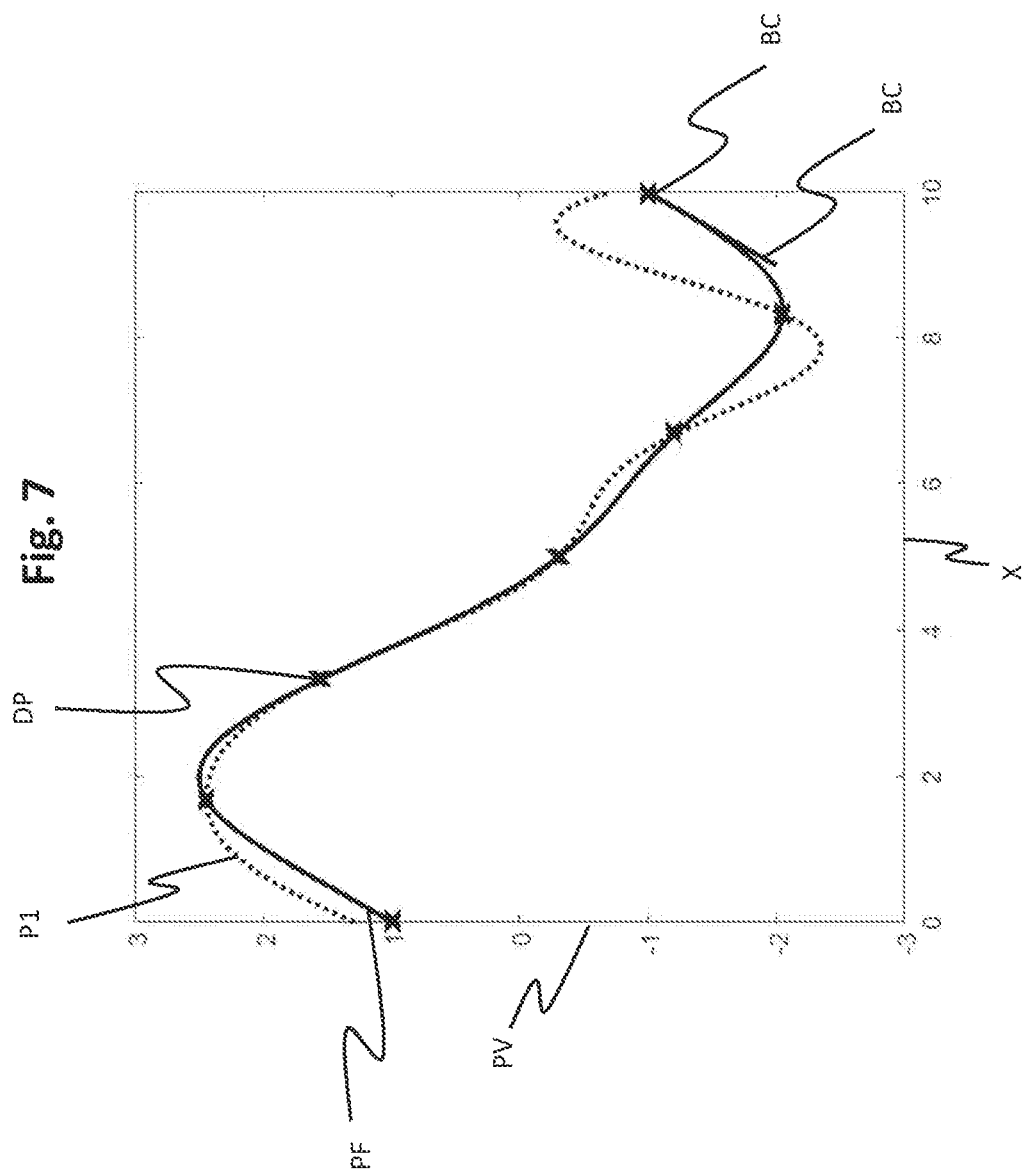
FIG. 7 shows a position-time diagram to graphically illustrate a further method step of the method for controlling an automation process according to one embodiment.

In FIG. 7, according to a following ninth method step 117, a selected profile function PF (solid curve) is adapted to the data points DP (crosses) and the boundary conditions BC.

In the present embodiment, a quintic spline has been selected as the profile function PF and a spline interpolation of the data points DP and the boundary conditions BC has been carried out as an adaptation process.

The adapted profile function PF reaches all data points DP and fulfills the boundary conditions BC, which is illustrated by the fact that the profile function PF begins in the starting position and ends in the end position and in close proximity to these positions corresponds to the solid lines representing the starting and end speed.

The respective choice of the quintic spline as the profile function PF can ensure that the profile function PF satisfies continuity conditions that state that the profile function PF, or the second change profile P2, is continuously differentiable at least twice.

Figure 8:
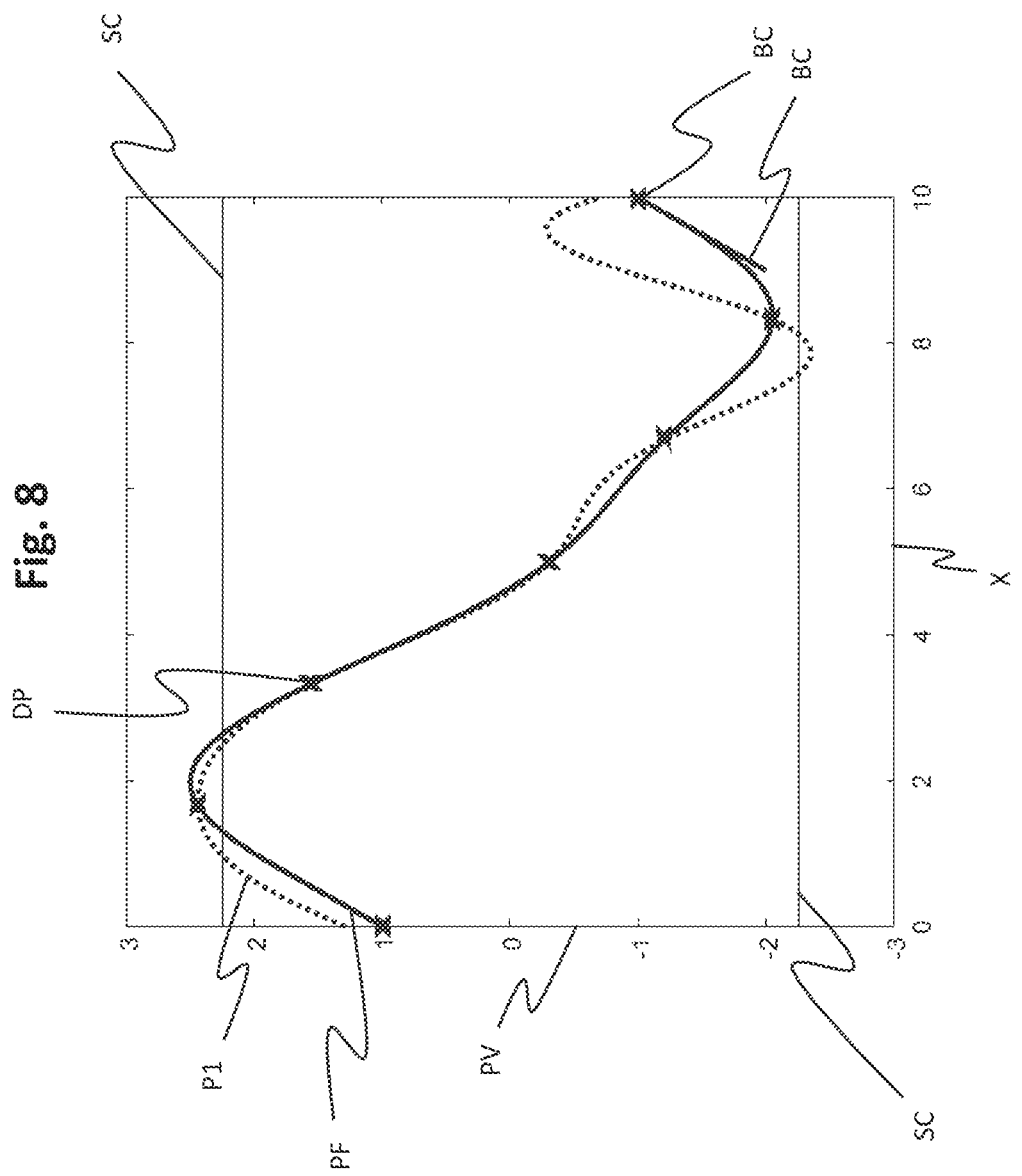
FIG. 8 shows a position-time diagram to graphically illustrate a further method step of the method for controlling an automation process according to one embodiment.

A secondary condition SC is furthermore shown in FIG. 8.

A position limit, that is to say a maximum and minimum position of the linear transport device 1405 on the running rail 1407, is determined as secondary conditions SC in FIG. 8. The secondary condition SC is indicated by the two horizontal parallel lines.

In the described linear transport process, however, further secondary conditions SC can also be taken into consideration. In the same way, further boundary conditions BC, can also be important.

For example, in addition to the maximum and minimum positions, maximum and minimum speeds or maximum and minimum accelerations of the linear transport device 1405 can be taken into consideration as secondary conditions SC.

The secondary conditions SC can be caused by the design of the process structure, in particular by the physical limits or by the maximum loads or other properties of the process components by which the process is carried out. Corresponding secondary conditions SC can also influence the respective performance of the process.

Figure 9:
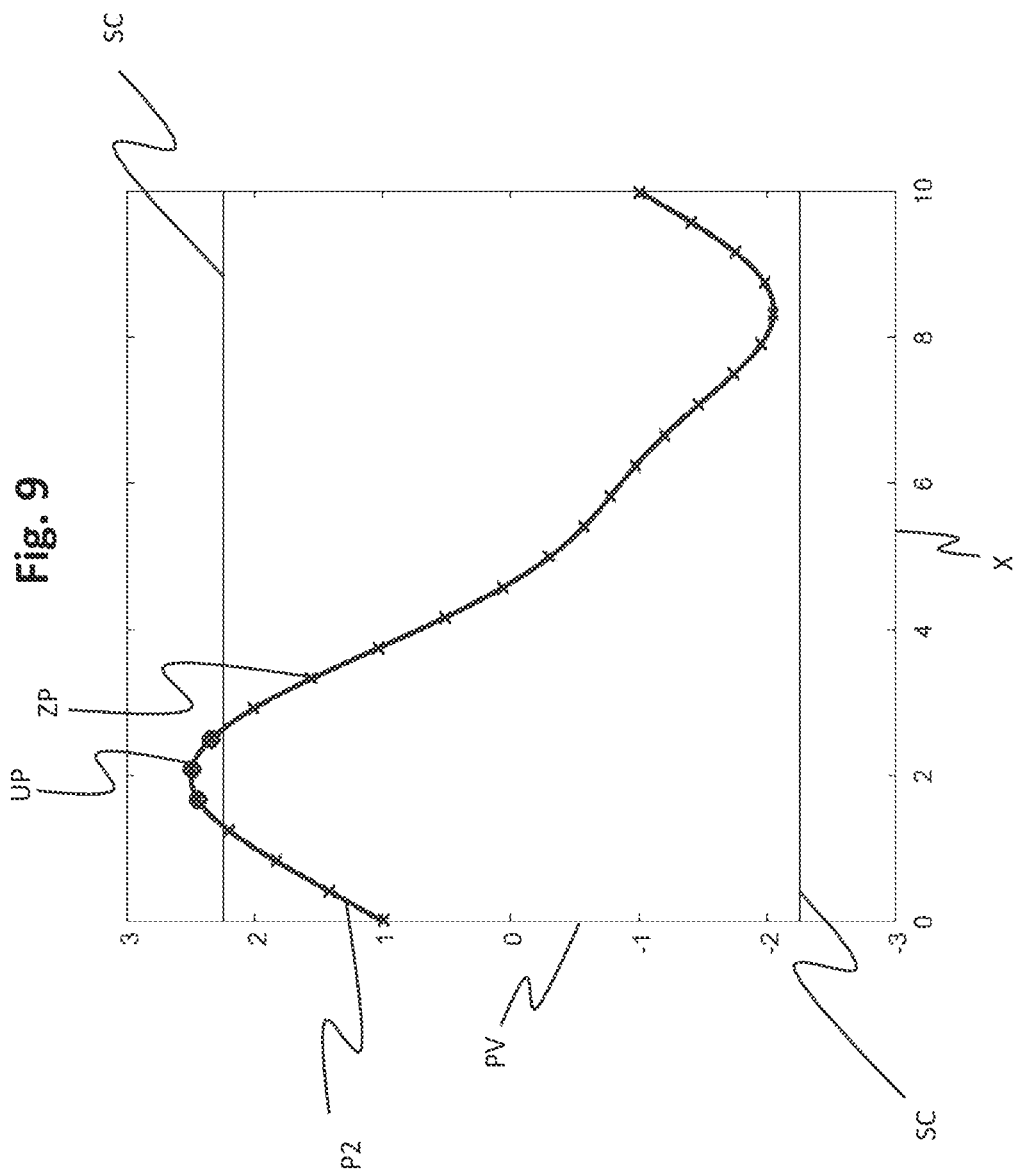
FIG. 9 shows a position-time diagram to graphically illustrate a further method step of the method for controlling an automation process according to one embodiment.

In FIG. 9, according to the fourth method step 107, the adapted profile function PF is identified as the second change profile P2.

Furthermore, according to a following fifth method step 109, it is checked whether the second change profile P2 satisfies the secondary conditions SC.

FIG. 9 shows that the second change profile P2 corresponds to the secondary condition SC of the minimum position, in that the second change profile P2 does not fall below the lower horizontal line that represents the minimum position limit.

The second change profile P2, however, violates the secondary condition SC of the maximum position limit in that the second change profile P2 exceeds the maximum position represented by the upper horizontal line. The second change profile P2 accordingly provides impermissible positions UP of the linear transport device 1405, which would be beyond the maximum position limit of the secondary conditions SC.

The circular points identify the impermissible positions UP of the linear transport device 1405 which are determined by the second change profile P2 and which are impermissible according to the secondary condition SC, since they are arranged beyond the position limit. The cross-shaped markings, on the other hand, identify the permissible positions ZP which are determined by the second change profile P2 and which are permissible according to the secondary condition SC.

The check of the second change profile P2 therefore comes to the result that the second change profile P2 does not satisfy the secondary conditions SC.

Figure 10:
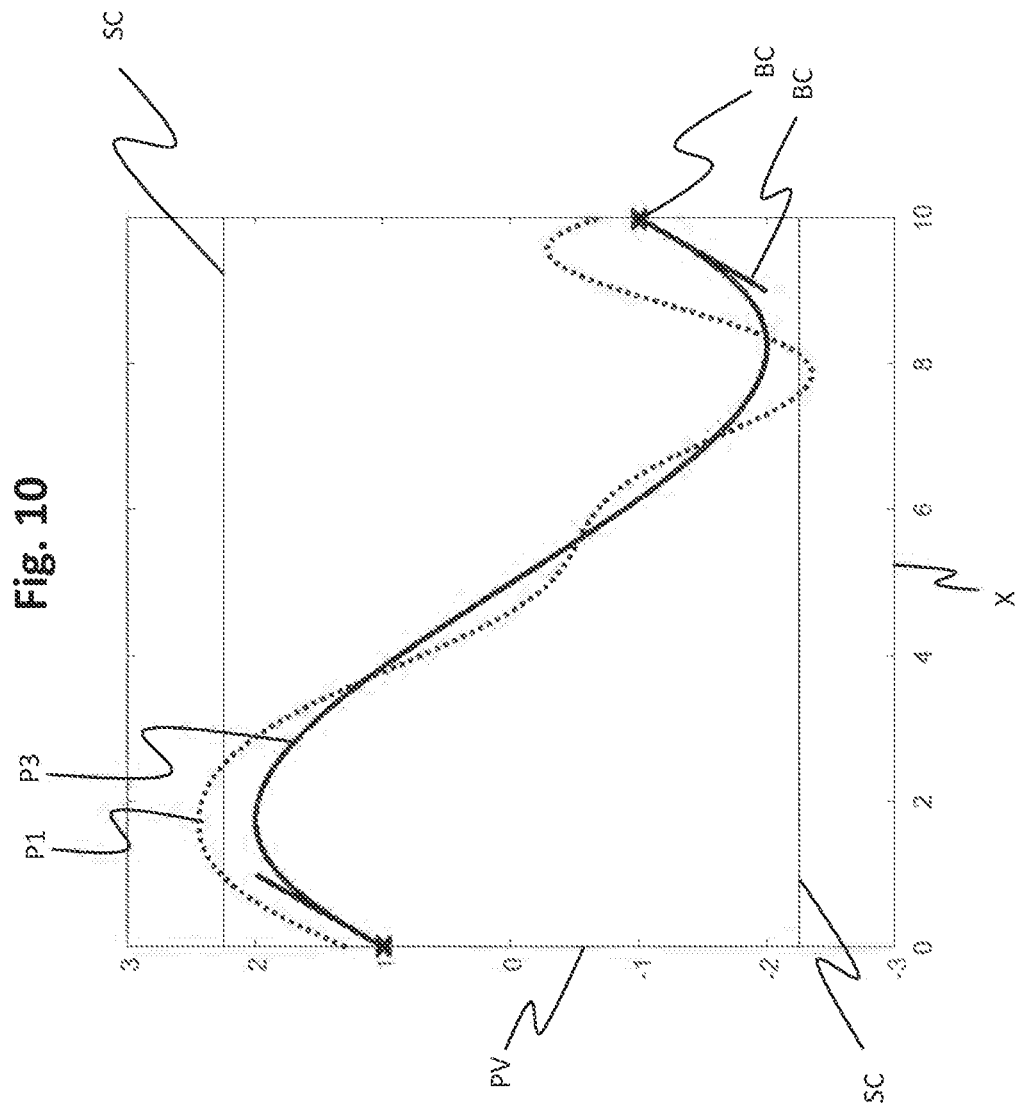
FIG. 10 shows a position-time diagram to graphically illustrate a further method step of the method for controlling an automation process according to one embodiment.

In FIG. 10, according to a seventh method step 113, the second change profile P2 is discarded and the control of the linear transport process takes place according to a fallback profile P3.

As shown in FIG. 10, the fallback profile P3, shown as a solid curve, corresponds to both the boundary conditions BC and the secondary conditions SC. The fallback profile P3 starts and ends in the respective starting and end positions and in these has a straight course having a slope that corresponds to the starting and end speeds. In addition, the fallback profile P3 remains within the position limits.

However, the fallback profile P3 is not optimized in accordance with the first change profile P1 (dotted curve) and the second change profile P2 with respect to the optimization criteria. This is made clear by the fact that the course of the fallback profile P3 does roughly follow the optimized first change profile P1, but deviates substantially from the first change profile P1 in details.

The control of the linear transport process according to the fallback profile P3 takes place in that a drive unit of a corresponding linear transport system is activated to drive a linear transport device 1405 of the transport system in such a way that the linear transport device 1405 at certain times assumes positions corresponding to the feedback profile P3 on a running rail 1407 of the linear transport system. The linear transport process is controlled according to a second change profile P2 in a comparable manner.

Figure 11:
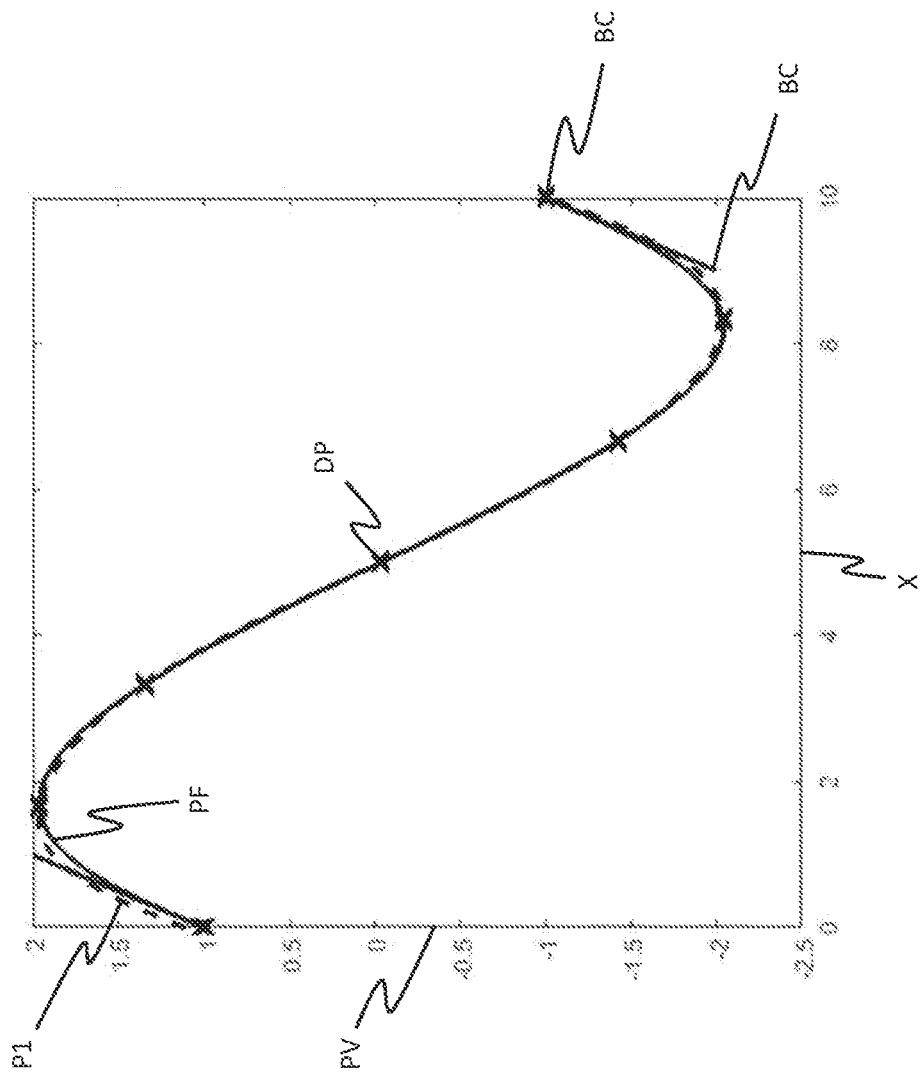
FIG. 11 shows a position-time diagram of a first change profile according to the method for controlling an automation process according to one embodiment.
Figure 12:
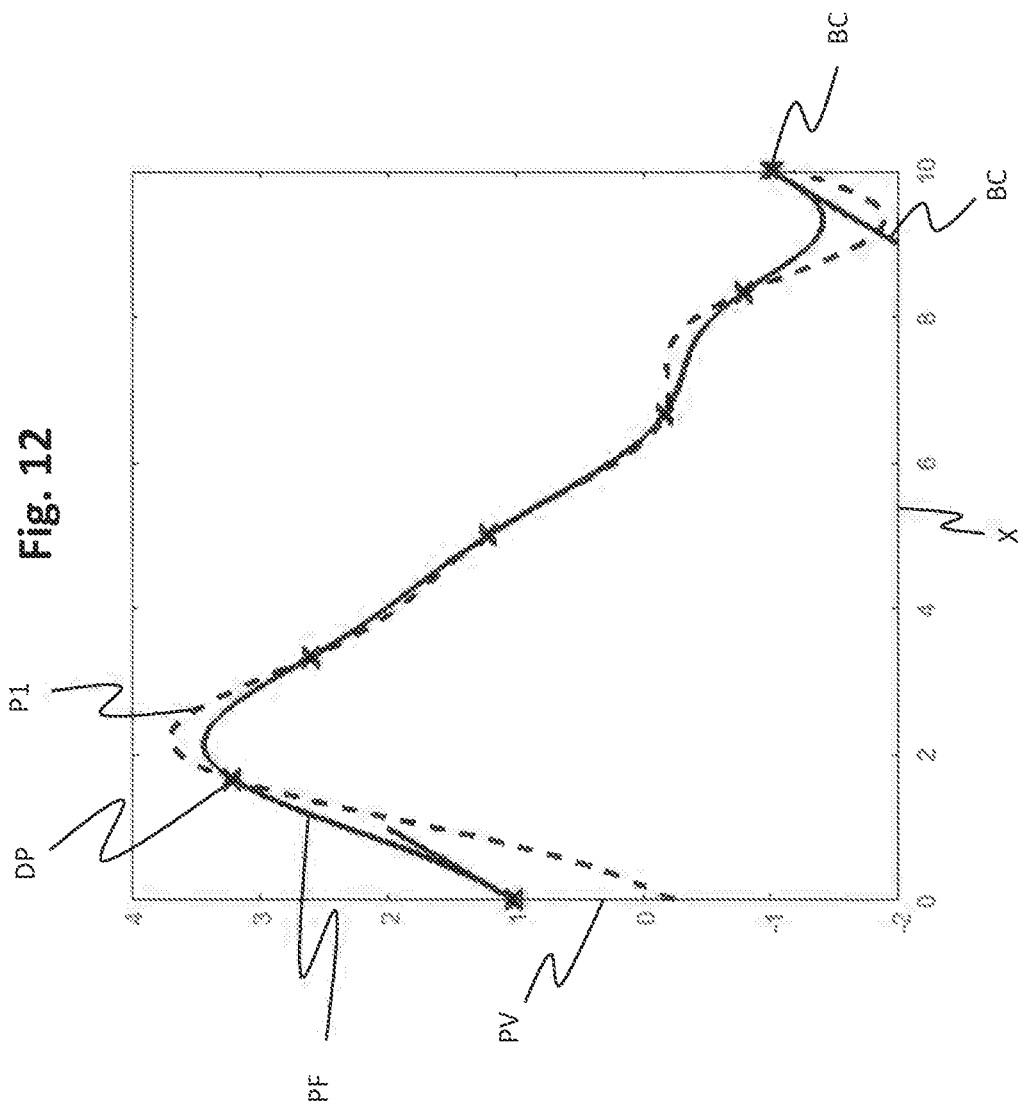
FIG. 12 shows a position-time diagram of a first change profile according to the method for controlling an automation process according to one embodiment.

FIG. 11 and FIG. 12 each show a position-time diagram of a first change profile P1 of the method 100 for controlling an automation process according to one embodiment.

The optimization of the first change profile P1 is shown, as already mentioned above, in the respective course of the first change profile P1. A change profile P, the course of which deviates from this optimized course, can indeed represent a process course of the automation process, but not an optimized process course.

FIG. 11 and FIG. 12 each show a result of a real-time-capable recognition method based on a non-linear optimization process using an artificial neural network, wherein FIG. 11 shows a first change profile P1 (dashed curve) which was determined by a well-trained artificial neural network, and FIG. 12 shows a first change profile P1 by a dashed curve, which was determined by a poorly trained artificial neural network.

In FIG. 11, the first change profile P1 only has a slight deviation from the boundary conditions BC. The starting position and starting speed are slightly missed, while the end position and end speed are reached.

The continuity conditions are also met. Overall, the adapted profile function PF (solid curve) deviates only slightly from the first change profile P1 (dashed curve).

In FIG. 12, however, the first change profile P1 has a substantial deviation from the boundary conditions BC. The first change profile P1 has strong deviations both in the starting and end positions and also in the starting and end speeds. The adapted profile function PF, shown as (solid curve), is also only capable of representing the first change profile P1 well only in the central area.

In the case of such inadequate results, as shown in FIG. 12, the corresponding artificial neural network or the real-time recognition method based on a non-linear optimization process would have to be prompted to complete further training runs or learning processes in order to provide better results in the following recognition methods.

Figure 13:
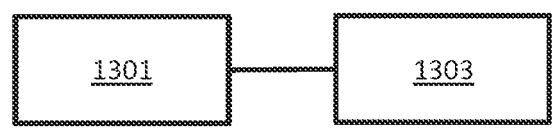
FIG. 13 shows a schematic illustration of an automation system for carrying out an automation process according to one embodiment.

FIG. 13 shows a schematic illustration of an automation system 1300 for carrying out an automation process.

The automation system 1300 includes a process unit 1301 for executing the automation process and a control unit 1303 for controlling the process unit 1301.

The process unit 1301 can include process components corresponding to the respective automation process.

For example, the automation system 1300 can be a linear transport system. In this regard, the process unit 1301 could comprise at least one movable linear transport device 1405, at least one running rail 1407 for guiding the linear transport device 1405, and at least one drive unit 1412 for driving the linear transport device 1405.

FIG. 14 shows a schematic illustration of the automation system 1300 for carrying out an automation process according to a further embodiment.

In the present embodiment, the automation system 1300 is designed as a linear transport system.

Figure 16:
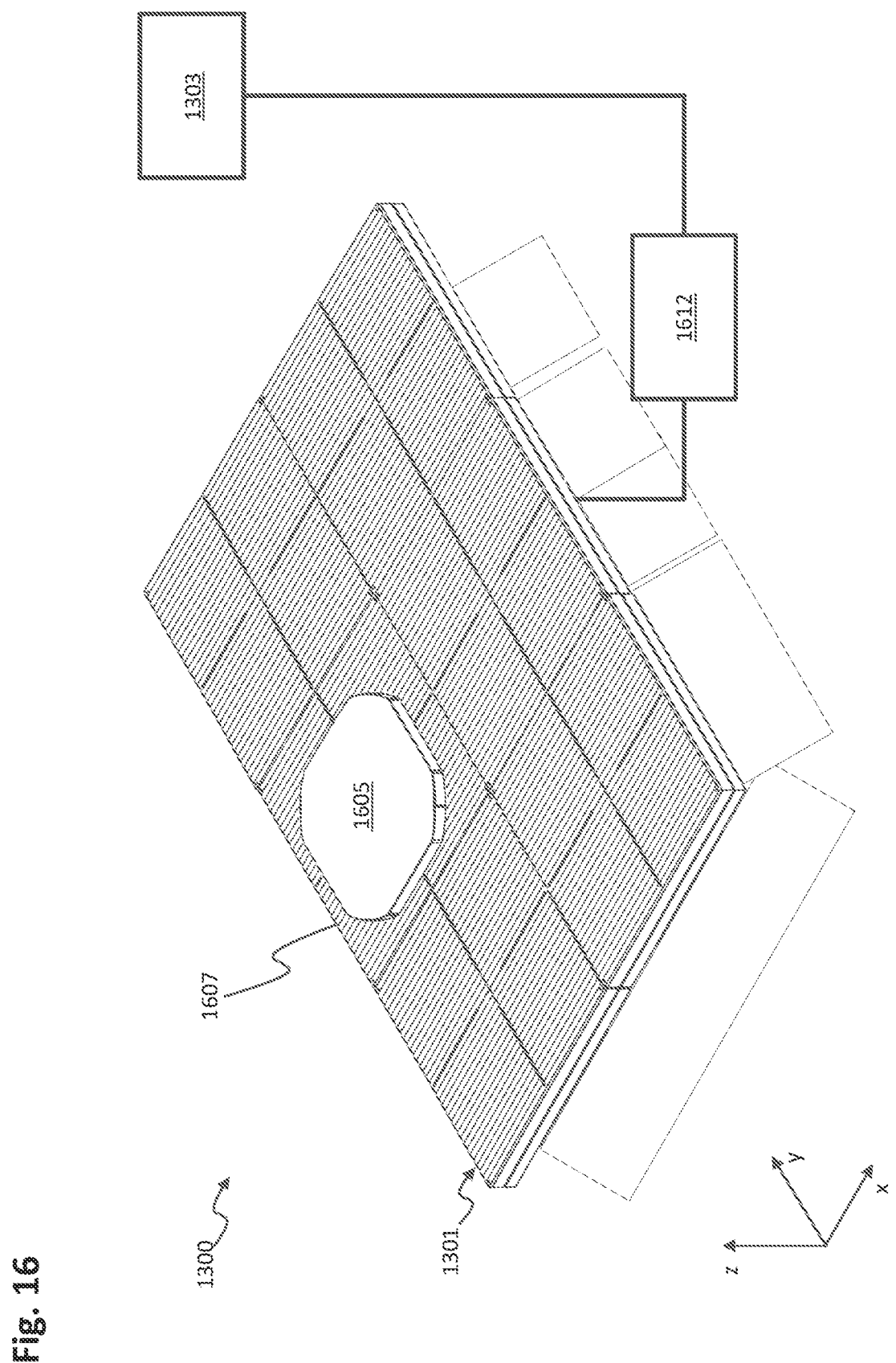
FIG. 16 shows a schematic illustration of an automation system for carrying out an automation process according to a further embodiment.

It is to be noted that FIG. 14 and in the following also FIGS. 15 and 16 are merely of a schematic nature and are not to scale. In this sense, components and elements shown in the figures can be shown exaggerated or reduced in size for better understanding. It is also to be noted that the reference signs in the figures have been chosen unchanged if the elements and/or components and/or sizes are identically formed.

The linear transport system 1300 in FIG. 14 comprises a process unit 1301 and a control unit 1303 connected to the process unit 1301.

The process unit 1301 comprises, for example, three linear transport devices 1405 and a running rail 1407 on which the linear transport devices 1405 are arranged.

The running rail 1407 can be designed as a closed path, which has two curved running rail sections, hereinafter also referred to as curved running rail 1411, and two straight running rail sections, hereinafter also referred to as straight running rail 1409. The linear transport devices 1405 can be guided along a running direction 1417 by the running rail.

In addition, the process unit 1301 comprises a drive unit 1412, which in the present embodiment is formed as straight motor modules 1413 and curved motor modules 1415. The geometry of the straight motor modules 1413 and/or the curved motor modules 1415 can be varied and combined as desired, as can the contour of the curved running rail 1411 and/or straight running rail 1409.

The straight motor modules 1413 and the curved motor modules 1415 are designed as linear motors. These linear motors include a plurality of stator teeth 1419, wherein electrical coils, which can be energized individually and separately from one another, are wound around at least a part of the stator teeth 1419.

A traveling magnetic field can be generated by the coils, by which the linear transport devices 1405 are movable along the running rail 1407.

The control unit 1303 is connected to the process unit 1301 and is used to control the movement of the linear transport devices 1405 on the running rail 1407.

For example, the movement of a linear transport device 1405 can be controlled by a change profile P as described above having the position of the linear transport device 1405 as process variable PV, comparable to the change profiles P described in FIGS. 4 to 12.

The positions described in the change profiles P thus correspond in the present case to positions of a respective linear transport device 1405 on the running rail 1407. These positions can be determined by a sensor unit and implemented exactly by the straight motor modules 1413 and/or curved motor modules 1415.

A linear transport device 1405 is therefore controlled by the control unit 1303 according to a determined change profile P in such a way that the control unit 1303 activates the straight motor modules 1413 and/or curved motor modules 1415 in such a way that the linear transport devices 1405 successively approach the positions on the running rail 1407 determined by the change profile P and thus execute a transport movement that corresponds to the course of the respective change profile P.

In order to avoid collisions of several linear transport devices 1405 on the running rail 1407, the control unit 1303 can take into consideration the presence and movement of further linear transport devices 1405 when determining suitable change profiles P for a linear transport device 1405. This can be implemented, for example, by corresponding boundary conditions BC and/or secondary conditions SC.

For example, maximum speeds of the individual linear transport devices 1405 can be adapted in such a way that a faster linear transport device 1405 colliding with a slower linear transport device 1405 traveling ahead is avoided. For example, negative speeds and the associated reversing of the linear transport devices 1405 can also be prevented by corresponding secondary conditions SC.

In addition to other linear transport devices 1405, movements of a product to be transported can also be taken into account in the control of the linear transport device 1405 by way of a corresponding change profile P. For example, the movement of a linear transport device 1405 on the running rail 1407 can be synchronized with the movement of a product to be transported, which moves on a separate path, in such a way that the linear transport device 1405 and the product to be transported arrive at the same times at a pick-up location at which the linear transport device 1405 picks up the product to be transported and transports it from there to a delivery location.

A change profile P, as shown in FIGS. 4 to 12, for controlling a linear transport device 1405 can describe in a movement of the linear transport device 1405 along the complete running rail 1407, so that the linear transport device 1405 completes a complete cycle along the running rail 1407. A corresponding change profile P can, however, also describe multiple cycles of the linear transport device 1405. Alternatively, a corresponding change profile P can also describe only a movement of a linear transport device 1405 along a section of the running rail 1407, so that multiple change profiles P would have to be executed in chronological succession for a complete cycle of the linear transport device 1405.

With the control unit 1303 and change profiles P correspondingly adapted to one another, the linear transport devices 1405 can be moved individually, freely or synchronously in a group of multiple linear transport devices 1405. The linear transport devices 1405 of the linear transport system 1300 is thus usable flexibly for various positioning or transport tasks.

FIG. 15 shows a partial lateral perspective view of the linear transport system 1300 in FIG. 14.

A straight running rail 1409 as well as a curved running rail 1411 and three linear transport devices 1405 are shown, wherein the number of linear transport devices 1405, as in FIG. 14, is selected as desired and can also differ from the number shown.

The drive unit 1412 comprises a curved motor module 1415 and a straight motor module 1413.

The magnets 1521 arranged on the linear transport devices 1405 can be driven in conjunction with the traveling magnetic field generated by the coils and described in connection with FIG. 14, without the need for further active drive elements on the linear transport devices 1405.

The current flow in the coils generates the traveling magnetic field for an operative connection to the magnets 1521 of the linear transport devices 1405. An operative connection describes an interaction of the traveling magnetic field of the coils with the magnets 1521 of the linear transport devices 1405, as a result of which they are moved along the curved running rail 1411 or straight running rail 1409.

Each linear transport device 1405 of the automation system 1300 designed as a linear transport system can thus be activated individually via the individual activation of the coils. Individual movements of individual linear transport devices 1405 as well as synchronous movements of multiple linear transport devices 1405 are thus possible.

To guide the linear transport devices 1405 on the running rail 1407, each linear transport device 1405 can each include a plurality of rollers 1523, which can roll on corresponding running surfaces 1525 of the running rail 1407.

The control unit 1303 can be an integrated control unit or an external control unit. Furthermore, the control unit can be a computer unit, a personal computer, a laptop, or a corresponding application.

Alternatively, the automation system 1300 can also be a planar transport system.

FIG. 16 shows a schematic illustration of the automation system 1300 for carrying out an automation process according to a further embodiment.

In the present embodiment, the automation system 1300 is designed as a planar transport system.

The automation system 1300 designed as a planar transport system in FIG. 16 comprises a process unit 1301 and a control unit 1303 connected to the process unit 1301.

The process unit 1301 comprises a planar transport device 1605 and a planar path element 1607 on which the planar transport device 1605 is arranged.

The planar path element 1607 describes a two-dimensional flat surface on which the planar transport device 1605 can execute any two-dimensional or even one-dimensional movement.

The process unit 1301 furthermore comprises a drive unit 1612 which is connected to the planar path element 1607 and is designed to drive the planar transport device 1605 to move when it is arranged on the planar path element 1607.

Alternatively, the drive unit can also be integrated in the motor modules.

The process unit 1301 furthermore comprises a sensor unit, which can establish the position of the planar transport device 1605 on the planar path element 1607.

The control unit 1303 is connected to the drive unit 1612 and possibly the sensor unit in order to control the one-dimensional or two-dimensional movement of the planar transport device 1605 on the planar path element 1607.

The control of the planar transport device 1605 on the planar path element 1607 by the control unit 1303 according to a change profile P runs analogously to the method 100 described under FIGS. 4 to 10 and FIG. 14, FIG. 15.

After determining a suitable change profile P, the control unit 1303 activates the drive unit 1612 to move the planar transport device to the positions on the planar path element 1607 corresponding to the respective change profile P.

Deviating from the above-described linear transport process, to control the two-dimensional movement of the planar transport device 1605 on the planar path element 1607 in the course of the planar transport process, the process variable PV has to have two position components, an x component and a y component, to enable unique positioning of the planar transport device 1605 on the planar path element 1607.

Alternatively, the process variable PV can also include further components, for example an additional z-component or other components for determining the position.

However, a variable other than the position of the planar transport device 1605 can also again be selected here as the process variable PV.

Figure 17:
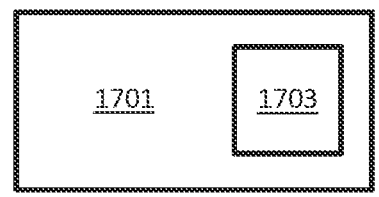
FIG. 17 shows a schematic illustration of a storage medium having a computer program for executing the method for controlling an automation process.

FIG. 17 shows a schematic illustration of a storage medium 1701 having a computer program 1703 for executing the method 100 for controlling an automation process.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

TABLE 1

List of reference symbols

| | |
|---|---|
| 100 | method for controlling an automation process |
| 101 | determining a first change profile |
| 103 | determining a second change profile |
| 105 | adapting a profile function to the first change profile |
| 107 | identifying the profile function as the second change profile |
| 109 | checking the second change profile |
| 111 | controlling based on the second change profile |
| 113 | controlling based on the fallback profile |
| 115 | determining a data point |
| 117 | adapting the profile function to a data point |
| 119 | determining the at least one boundary condition and the at least one secondary condition |
| 120 | determining the first change profile taking into consideration the at least one boundary condition and the at least one secondary condition |
| 121 | determining the fallback profile |
| 1300 | automation system |
| 1301 | process unit |
| 1303 | control unit |
| 1300 | automation system |
| 1301 | process unit |
| 1405 | linear transport device |
| 1407 | running rail |
| 1409 | straight running rail |
| 1411 | curved running rail |
| 1412 | drive unit |
| 1413 | straight motor module |
| 1415 | curved motor module |
| 1417 | running direction |
| 1419 | stator tooth |
| 1521 | magnet |
| 1523 | roller |
| 1525 | running surface |
| 1605 | planar transport device |
| 1607 | planar path element |
| 1612 | drive unit |
| 1701 | storage medium |
| 1703 | computer program |
| P | change profile |
| P1 | first change profile |
| P2 | second change profile |
| P3 | fallback profile |
| PV | process variable |
| X | argument |
| BC | boundary condition |
| SC | secondary condition |
| DP | data point |
| PF | profile function |
| ZP | permissible position |
| UP | impermissible position |

The invention claimed is:

1. A method for controlling an automation process in real time based on at least one change profile of at least one process variable, wherein a change profile describes a course of the process variable with respect to an argument of the process variable, the method comprising the method steps:

determining a first change profile by a real-time-capable recognition method based on a non-linear optimization process, taking into consideration at least one boundary condition of the process variable;

wherein the real-time-capable recognition method based on a non-linear optimization process is implemented by an artificial neural network, and wherein a non-linear optimization process is carried out in a learning process of the artificial neural network;

determining a second change profile by a numerical algorithm based on the first change profile, comprising:
  adapting a selected profile function to the first change profile by a numerical adaptation process; and
  identifying the adapted profile function as a second change profile;

checking whether the second change profile satisfies at least one secondary condition of the process variable;

controlling the automation process based on the second change profile if the second change profile satisfies the at least one secondary condition; and controlling the automation process based on a predetermined fallback profile if the second change profile does not satisfy the at least one secondary condition.

2. The method of claim 1, wherein adapting the selected profile function to the first change profile of the numerical adaptation process comprises the method steps:
  determining at least one data point of the first change profile; and
  adapting the selected profile function to the at least one data point of the first change profile and to the at least one boundary condition.

3. The method of claim 1, wherein the method step of determining a first change profile comprises the method step:
  determining the first change profile by a real-time-capable recognition method based on a non-linear optimization process, taking into consideration the at least one boundary condition and the at least one secondary condition.

4. The method of claim 1, furthermore comprising the method step:
  generating the fallback profile, wherein the feedback profile fulfills the at least one boundary condition and the at least one secondary condition.

5. The method of claim 1, wherein the selected profile function is a quintic spline and is continuously differentiable at least twice.

6. The method of claim 1, wherein the second change profile is continuously differentiable at least twice.

7. The method of claim 1, wherein the at least one boundary condition is a starting value of the process variable, a starting speed, a starting acceleration, an end value of the process variable, an end speed, an end acceleration, and/or a length of the change profile.

8. The method of claim 1, wherein the at least one secondary condition is a maximum value of the process variable, a minimum value of the process variable, a maximum speed, a minimum speed, a maximum acceleration, and/or a minimum acceleration.

9. The method of claim 1, wherein the fallback profile satisfies the at least one boundary condition and the at least one secondary condition and is continuously differentiable at least twice.

10. The method of claim 1, wherein real time is a hard real time.

11. An automation system having a process unit for executing an automation process and a control unit for controlling the process unit, wherein the control unit is configured to execute a method as claimed in claim 1.

12. The automation system of claim 11, wherein the automation system is a linear transport system, and wherein the process unit comprises:
  at least one linear transport device for executing a transport movement,
  at least one running rail for guiding the linear transport device in a predetermined linear path movement; and
  a drive unit for driving the at least one linear transport device on the at least one running rail.

13. The automation system of claim 11, wherein the automation system is a planar transport system, and wherein the process unit comprises:
  at least one planar transport device for executing a transport movement,
  at least one planar path element for guiding the planar transport device in a predefined two-dimensional guide area in which the planar transport device can execute a transport movement; and
  a drive unit for driving the at least one planar transport device on the at least one planar path element.

14. The automation system of claim 12, wherein the process variable is a position of the linear transport device or the planar transport device in a coordinate system, wherein the at least one boundary condition comprises at least a starting position, a starting speed, a starting acceleration, a starting direction, an end position, an end speed, an end acceleration, and an end direction of the linear transport device and/or the planar transport device, and wherein the at least one secondary condition comprises a maximum position, a minimum position, a maximum speed, a minimum speed, a maximum acceleration, and a minimum acceleration of the linear transport device and/or the planar transport device.

15. A machine-readable storage medium on which computer program code is stored, comprising commands which, when the computer program code is executed by a computer processor or control unit, cause the computer processor or control unit to execute a method according to claim 1.

16. A computer system comprising the machine-readable storage medium on which computer program code is stored according to claim 15.

* * * * *